United States Patent
Moulebhar

(10) Patent No.: US 7,805,947 B2
(45) Date of Patent: Oct. 5, 2010

(54) AIRCRAFT WITH DISENGAGEABLE ENGINE AND AUXILIARY POWER UNIT COMPONENTS

(76) Inventor: Djamal Moulebhar, 1020 1125th St. NE., #13, Seattle, WA (US) 98122

( * ) Notice: Subject to any disclaimer, the term of this patent is extended or adjusted under 35 U.S.C. 154(b) by 1174 days.

(21) Appl. No.: 11/419,192

(22) Filed: May 18, 2006

(65) Prior Publication Data
US 2006/0260323 A1 Nov. 23, 2006

Related U.S. Application Data

(60) Provisional application No. 60/594,929, filed on May 19, 2005.

(51) Int. Cl.
*F02C 7/268* (2006.01)
*F02C 7/32* (2006.01)
*F02K 3/00* (2006.01)

(52) U.S. Cl. .................. 60/787; 60/802; 60/39.163

(58) Field of Classification Search ............. 60/802, 60/226.1, 39.163, 787, 788; 74/DIG. 5
See application file for complete search history.

(56) References Cited

U.S. PATENT DOCUMENTS

| | | | | |
|---|---|---|---|---|
| 2,409,159 A | * | 10/1946 | Singleton | 60/39.183 |
| 3,965,673 A | * | 6/1976 | Friedrich | 60/788 |
| 4,077,202 A | * | 3/1978 | Schutze | 60/788 |
| 4,542,722 A | * | 9/1985 | Reynolds | 60/788 |
| 4,864,812 A | * | 9/1989 | Rodgers et al. | 60/802 |
| 6,142,418 A | * | 11/2000 | Weber et al. | 244/58 |

\* cited by examiner

*Primary Examiner*—Ted Kim
(74) *Attorney, Agent, or Firm*—Pai Patent & Trademark Law Firm; Chao-Chang David Pai; Ian Graham Clapp

(57) ABSTRACT

Several improvements to an aircraft turbine engine and Auxiliary Power Unit (APU) are disclosed, as well as methods of using these improvements in routine and emergency aircraft operations. The improvements comprise the addition of cockpit-controllable clutches that can be used to independently disconnect the engine's integrated drive generator (IDG), engine driven pump (EDP), fuel pump, and oil pump from the engine gearbox. These engine components may then be connected to air turbines by the use of additional clutches and then powered by the turbines. Similar arrangements are provided for the APU components. Cranking pads, attached to various engine and APU components, are disclosed to provide a means for externally powering the components for testing purposes and to assist with engine and APU start. Detailed methods are disclosed to use the new components for routine ground-testing and maintenance and for the enhancement of flight safety, minimization of engine component damage, and extension of engine-out flying range in the case of an emergency in-flight engine shutdown.

5 Claims, 7 Drawing Sheets

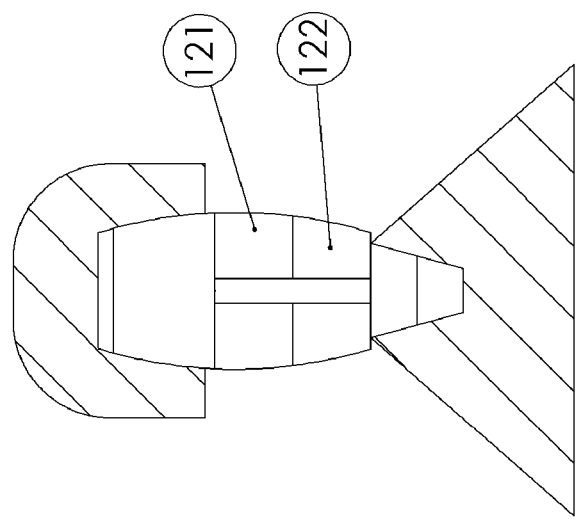
DETAIL A
FIG. 3
(PRIOR ART)
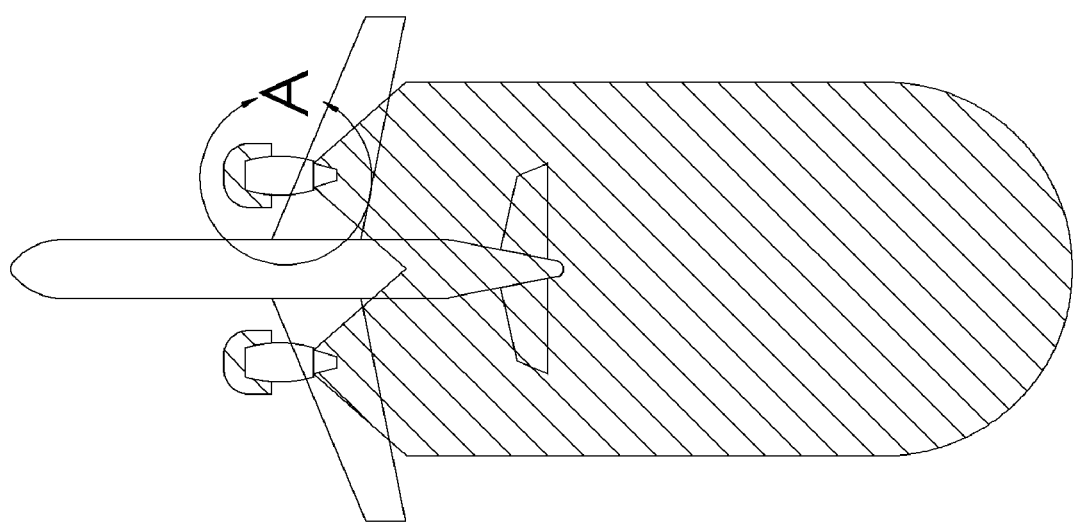

AIRCRAFT WITH DISENGAGEABLE ENGINE AND AUXILIARY POWER UNIT COMPONENTS

CROSS-REFERENCE TO RELATED APPLICATIONS

This application claims the benefit of U.S. Provisional Application No. 60/594,929, filed May 19, 2005, which is incorporated herein by reference.

BACKGROUND OF THE INVENTION

1. Field of the Invention

The invention relates to methods and devices for improving the safety of flight operations of turbine-powered aircraft and the efficient maintenance of aircraft engines and auxiliary power units (APU's).

2. Description of the Related Art

Aircraft gas turbine engines particularly turbofan and APU comprise many components that require an adequate and proper maintenance to operate reliably and efficiently. In order to test or troubleshoot engine and APU components and systems, it is usually necessary to run the engine or the APU. This leads to many safety hazards around engines, APU, and aircraft and increases the use of fuel and the amount of resulting pollutants that enter the atmosphere. For example, it is not allowed (not safe and practical) to run a jet engine inside hangars, or while the aircraft is lifted on jacks (usually inside the hangar for maintenance purpose) or parked at an airport gate (unless for a limited time and engine running at low power). The use of the APU inside the hangar is not convenient and necessitates a lot of precautions. In certain airports it is permissible to run up an engine at idle only (for a ground test) and for 5 minutes at the gate, and to use APU for 15 minutes maximum during aircraft turn-around time. Because of such restrictions, safety and environmental concerns, the engine must be run up (even at high power and longer time if needed) outside of the hangar and away from the airport gate, in a cleared area, where workers and the aircraft are exposed to the elements. Additionally, while the engine is running in remote location, there is always the danger that personnel, FOD (foreign object debris) might be sucked into the engine. Performing maintenance work like leak checks especially at idle will expose the mechanic to the engine inlet suction especially if leak is situated in the fan case with open fan cowls (especially in engines with gearbox installed on the fan case): in this case the mechanic will be unaware of the limit of the safe zone around the engine because he can not see the red warning stripe that indicates the limit of the safe area (the mechanic is under the inner side of the fan cowls and the red warning stripe is on the outer side of the fan cowls). Some leak checks are performed at part power 70% N1: in this type of leak check, it is difficult to detect the leakage since the fan and the reverser cowls are closed (even for idle leak check the reverser cowls are closed). When performing engine manual start especially in the high and medium bypass ratio engines, the mechanic will be near to the engine inlet suction and in certain engines he will be ahead of the red stripe and very close the engine inlet suction. In addition during engine manual start, there is a risk of starter disintegration (uncontained starter failure) if the pilot delay or forget to inform the mechanic to close manually the start valve. Even if it is closed on time, it will be around 55-56% N2 for certain recent engines and the mechanic will be close to the engine inlet suction. Sometimes some problems especially in engine starting system (like the start valve) may occur prior the start of the shutdown engine during single or reduced engines taxiing in the taxiway and necessitate aircraft ground turn-back in the gate. Working around a running engine may lead to accidents and injuries that can be fatal mainly in the recent engines (particularly high bypass ratio and even medium bypass ratio) because they are usually fitted with large fan and without inlet guide vanes (among the recent fatal accident, a mechanic was sucked into engine during oil leak check at George Bush Intercontinental airport, Jan. 16, 2006). Personnel and objects can also be blown across the tarmac by the jet blast (high velocity). This exhaust is extremely hot and can burn workers or cause heat damage to surrounding objects.

Although in-flight shutdowns of jet engines are relatively rare, when they do occur, special attention is required to avoid compromising flight safety or causing damage to the engine and its components. In certain emergencies or abnormal flight situations (like engine fire or hydraulic loss) some of the engine components are starved of lubricants while they are still being forced to turn, possibly leading to very costly damage to these components and a probable contamination of their systems. In other cases like engine shutdown or engine flame-out, the aircraft will be affected by the loss of an important part of electric, hydraulic, and pneumatic power. At certain high altitude, the restart of the engine and the start of the APU are not usually successful, so the pilots are forced to fly at lower altitudes to restart the engine or start the APU; at low altitude and low aircraft speed the restart could be difficult at low N2 speed especially in severe inclement weather. In case of multiple or all engines flame-out (due to adverse weather conditions, fuel depletion or contamination, or volcanic ash cloud) the systems' redundancy in the present aircraft will not provide a safe flight and landing. Certain dispatch conditions affect the aircraft like: the case of a twinjet is dispatched with the start valve operating manually only, where the engine starter assisted restart is not possible in case of aircraft is out windmill start limit especially at high altitude. In case of certain abnormal flight and emergency situations (all engines flame-out, engine fire, APU automatic shutdown, etc.) or anomalies (engines bleed trip-off) there is no back-up power for pneumatic power especially for long ETOPS flights.

What is needed, then, is a modification of aircraft gas turbine engine (the turbofan, turbojet, and turboprop can be fitted with these accessories and supplied with ram air, from an operating engine, APU, or any appropriate combination of air sources) and APU components coupled with a method to allow testing and troubleshooting individual engine and APU components, and systems without running the engine or the APU while the aircraft is undergoing maintenance on the ground. What is also needed is a modification of aircraft gas turbine engine and the APU components coupled with a method that allows more optimal, less disruptive and safer procedures regarding the engine and the APU during in-flight abnormal and emergency cases, and increases system redundancy and flexibility. The present invention provides a solution to both of these needs.

BRIEF SUMMARY OF THE INVENTION

Certain aircraft's engine (turbofan) and Auxiliary Power Unit (APU) gearbox components are fitted with certain accessories: clutches, cranking pads, air turbines, air valves, and air compressors. These engine and APU gearbox components are disconnected from their respective gearboxes and are connected to air turbines using clutches. On the ground, these gearbox components are driven by the turbines, which are supplied by air through an outlet air compressor, or driven by cranking pads using a motor. Each engine and APU gearbox component may therefore be driven separately without running the entire engine or APU. This will allow personnel to test and troubleshoot the engine/APU gearbox components and related systems when the aircraft is inside a hangar and/or lifted on jacks, or at an airport gate (apron) without towing the aircraft away from the hangar or the gate, without running the engine and APU, and without being exposed to hazard areas around the engine, APU, and aircraft. According to this invention, leak check, test, and troubleshooting of the engine/APU components and systems are performed easily and efficiently with engine fan and reverser cowls open.

When the engine and APU gearbox components are connected to their respective gearbox and driven by the related turbine or the cranking pad, they can also be utilized as a starter for the engine or APU: According to this invention there is no dedicated starter as in the current engines, because many of these gearbox components can be used as starters. They can also provide higher engine motor speed on the ground. Certain engine and APU components (IDG, EDP, APU generator, engine compressor, APU compressors, and APU hydraulic pump) can provide electric, hydraulic, and pneumatic power on ground when they are disconnected from their respective gearbox and driven by an air compressor outlet or motor (no need to run the entire APU, to use the ground power unit, ground pneumatic cart, or the ground hydraulic power). The compressor of the APU starter-generator, the hydraulic pump, or installed on engine gearbox can provide pneumatic power for the test and troubleshooting of air conditioning system on the ground (even inside hangar) and during the aircraft turn-around time to supply conditioned air to the aircraft. Other applications listed below in other paragraphs, ensue from installing these new accessories (clutches, cranking pads, turbines, compressors, valves).

During certain flight emergency conditions or abnormal flight situations, various engine or APU components can be taken off-line by use of the appropriate clutch. By this method, the disconnected component and its associated system can be saved from damage because during such an emergency this component will stop turning when it is disconnected. This component will therefore not need to be lubricated, which is a significant advantage because the lubricant (fuel, oil, or hydraulic fluid) will be shut off during the emergency or lost if there is leakage. During other emergencies and flight abnormal situations, by using a clutch that connects the component to the engine or APU gearbox, it is possible to disconnect the component, which is affected by the emergency condition from the engine or APU gearbox. Then, by using a second clutch it is possible to connect the gearbox component to an air turbine. The associated turbine of the engine gearbox component receives air from the engine secondary air flow (engine bypass air), ram air, APU air, or bleed air from operating engine(s), air from compressors attached the APU gearbox components (APU starter-generator and APU hydraulic pump), air from a compressor attached to the engine gearbox, or any appropriate combination of these sources (redundancy in air sources will assure at least the availability of one air source, like in case of the fan or both rotors get seized the engine bypass air is not available) through air valves. The associated turbine of the APU gearbox component (starter-generator or hydraulic pump) is supplied with ram air, operating engine(s), or any appropriate combination of air sources. The turbine drives the disconnected component so the component can provide emergency power (e.g., electric, hydraulic, or pneumatic) to certain critical flight controls during an in-flight engine shutdown or emergency (even after engine or APU fire), or during an APU failure. The engine or APU gearbox component may be fitted a reduction gear or speed regulator that can be used when driven by the turbine (depend on air sources provided to the turbine). If certain engine and APU gearbox components fail in flight, these components can be disconnected from the gearbox to prevent further damage to these components if the failure is inside the component (internal failure). If the failure is not inside the component itself (external failure), then the undamaged component can be driven using the appropriate turbine supplied by any appropriate combination of the air sources (mentioned above) to produce standby power. Additionally, certain gearbox components (IDG and/or EDP, or compressor), the turbine, and the engine gearbox can be connected all together after an engine flame-out to restart the engine (even at high altitude) or to obtain a quick recovery from engine flame-out because the turbine will provide torque to the gearbox through the component (in case the airplane is out of the windmill start limits). The use of the IDG, the EDP, and the compressor in the same time as starter will improve considerably the restart of the engine. To improve APU start in the flight, it is possible to connect an APU starter-generator and hydraulic pump, the related turbine, and the APU gearbox all together to provide the adequate torque; this technique would be employed mainly at high altitude, where normal APU start is not always successful especially when the APU is cold-soaked after long flight during cruise. Whether the APU is operating or not, the compressor (through the turbine) of the APU starter-generator or the hydraulic pump can provide back-up power pneumatic power.

BRIEF DESCRIPTION OF THE DRAWINGS

FIG. 3 is a schematic representation of the hazard areas (the shaded areas in the drawings) around the engine and the aircraft.

DETAILED DESCRIPTION OF THE PREFERRED EMBODIMENTS

Figure 1:
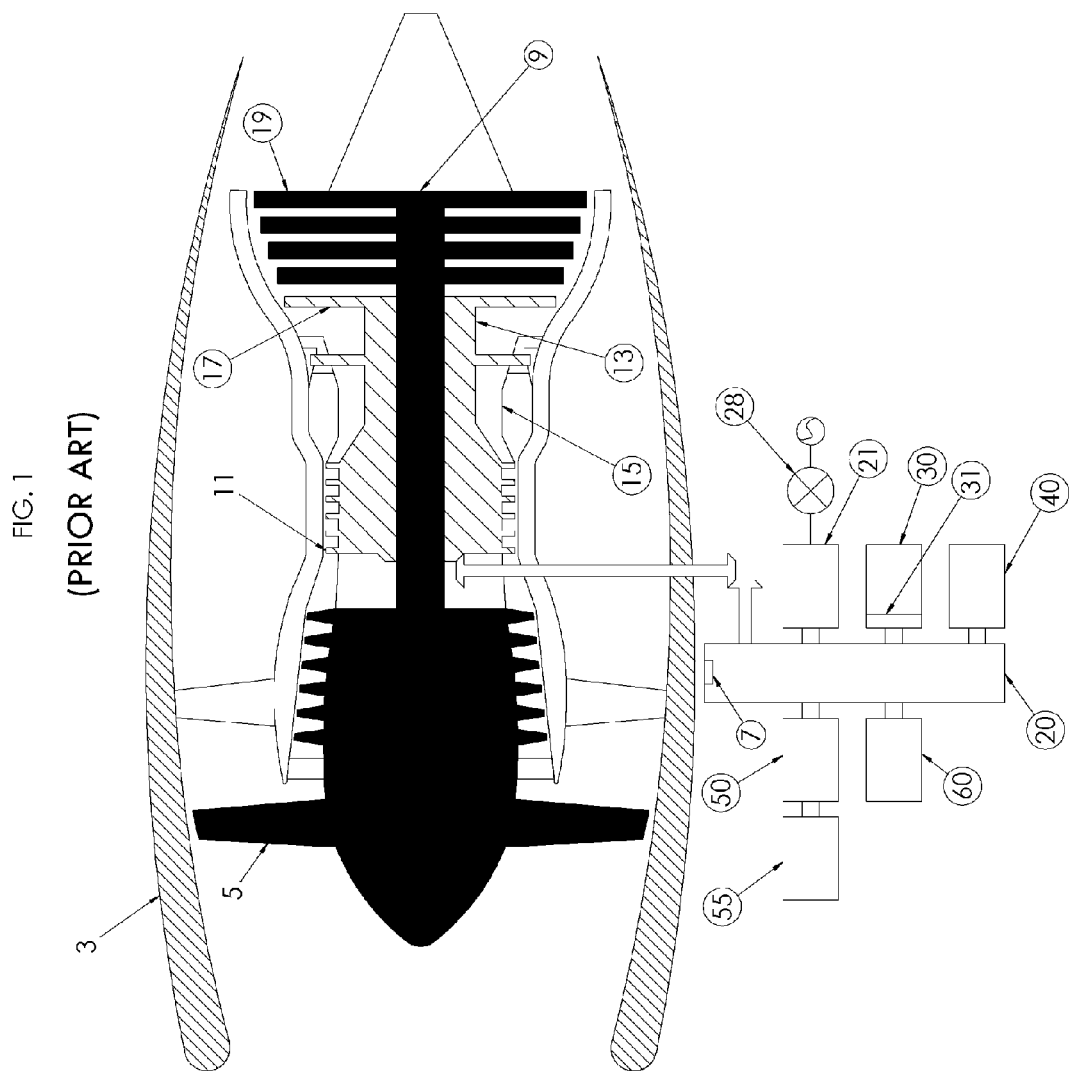
FIG. 1 is a schematic representation of an aircraft gas turbine engine (here, a turbofan) including gearbox components.
Figure 2:
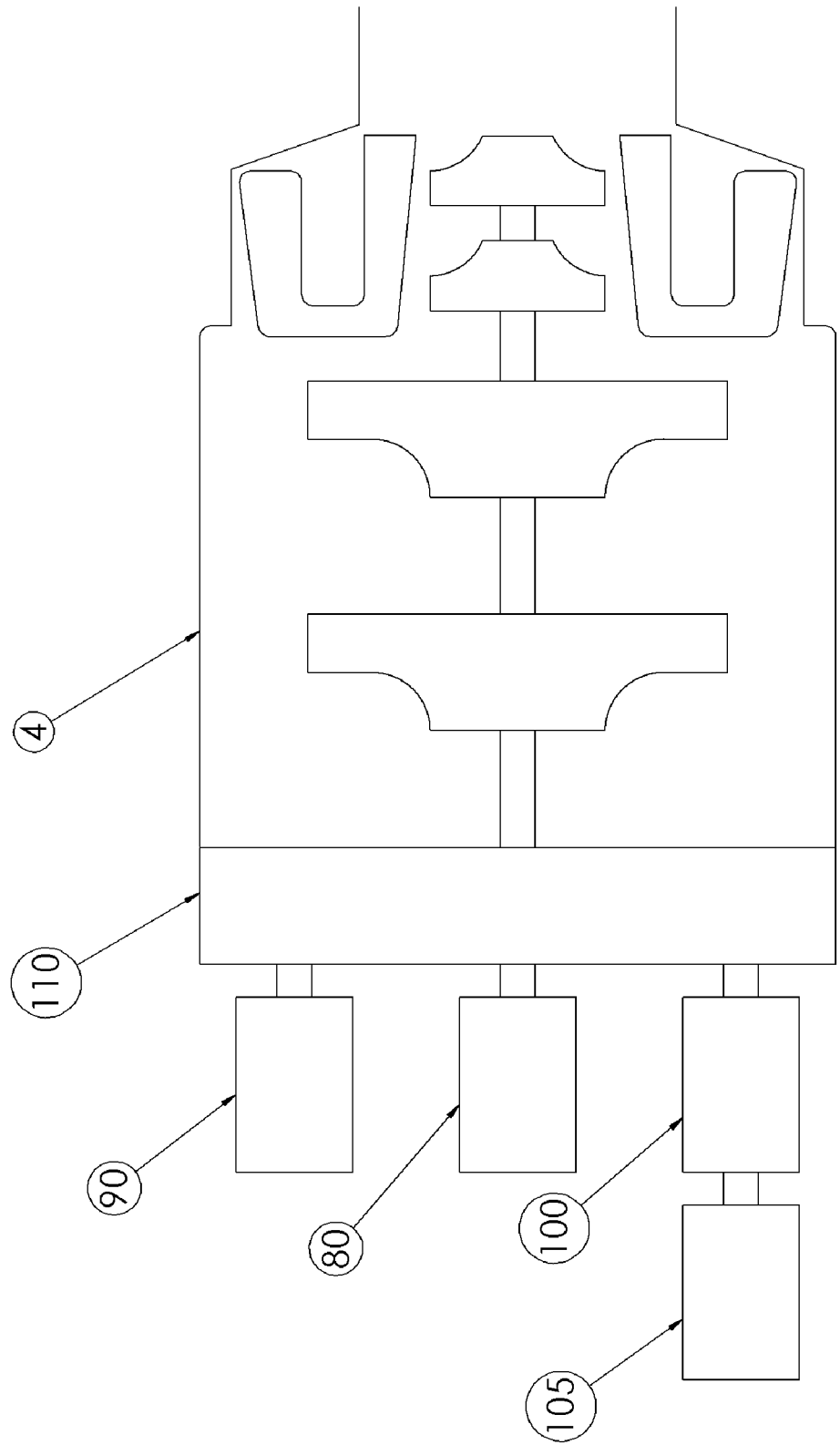
FIG. 2 is a schematic representation of an auxiliary power unit (APU) including gearbox components.

FIG. 1 depicts an aircraft gas turbine engine 3 (here, a turbofan engine) as it exists without any modifications from the present invention. The engine 3 includes a fan 5 that is driven by a low-pressure turbine (LP turbine) 19 through N1 shaft 9. A high-pressure turbine (HP turbine) 17 drives a high-pressure compressor (HP compressor) 11 through N2 shaft 13 by means of thermal energy from the combustion of fuel in a combustor 15. The HP compressor 11 drives a gearbox 20 that supplies mechanical power to the following components: an integrated drive generator (IDG) 30 and its clutch 31, an engine driven pump (EDP) 40, a fuel pump 50, a hydro-mechanical unit (HMU) 55, and an oil pump 60. A pneumatic starter 21 is supplied with air through start valve 28 to start the engine 3. The engine gearbox 20 is fitted with cranking pad 7.

Figure 4:
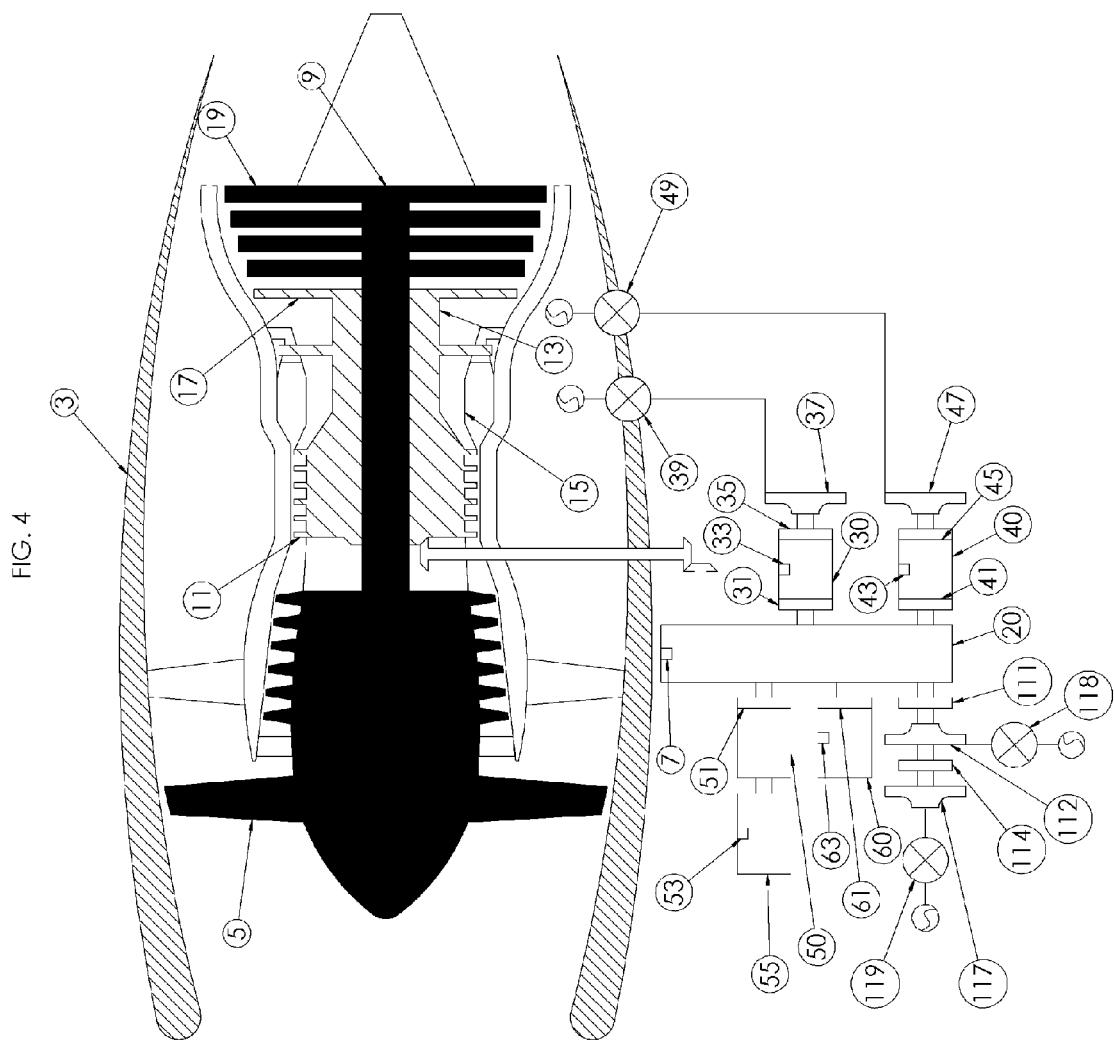
FIG. 4 is a schematic representation of an aircraft gas turbine engine (here, a turbofan) including the new accessories added to the engine gearbox components according to the present invention.

FIG. 4 shows that, as part of the invention, in addition to the already existing clutch 31, the IDG 30 is fitted with a clutch 35, a cranking pad 33, an air turbine 37, and an air valve 39; the EDP 40 is fitted with clutches 41 and 45, a cranking pad 43, an air turbine 47, and an air valve 49. Clutches 31 and 41 can disengage in order to disconnect IDG 30 and EDP 40, respectively (not necessarily simultaneously), from the engine gearbox 20 when needed during engine tests, flight emergencies and abnormal situations, etc. However, during normal aircraft operations these clutches remain engaged. Clutches 35 and 45 engage and connect the IDG 30 to turbine 37 and EDP 40 to turbine 47, respectively, when required during ground tests, flight emergencies, etc. During normal aircraft operations, these clutches are disengaged. As part of the invention the fuel pump 50 is fitted with a clutch 51 and the HMU 55 is fitted with a cranking pad 53 and the fuel pump 50 is normally connected to the engine gearbox 20 through clutch 51. The fuel pump 50 and the HMU 55 are driven by the same shaft. As part of the invention, the oil pump 60 is fitted with clutch 61 and cranking pad 63. During normal operations, the oil pump 60 is connected to the engine gearbox 20 through clutch 61. As part of the invention, the compressor 112 is fitted with air valve 118 and the clutch 111 that disconnects the compressor 112 from the engine gearbox 20 when needed on ground and in flight; and the turbine 117 is fitted with the air valve 119 and the clutch 114 that connects the turbine to the compressor 112 when needed on ground and flight. Normally the compressor 112 is connected to the engine gearbox 20 and disconnected from the turbine 117.

Figure 5:
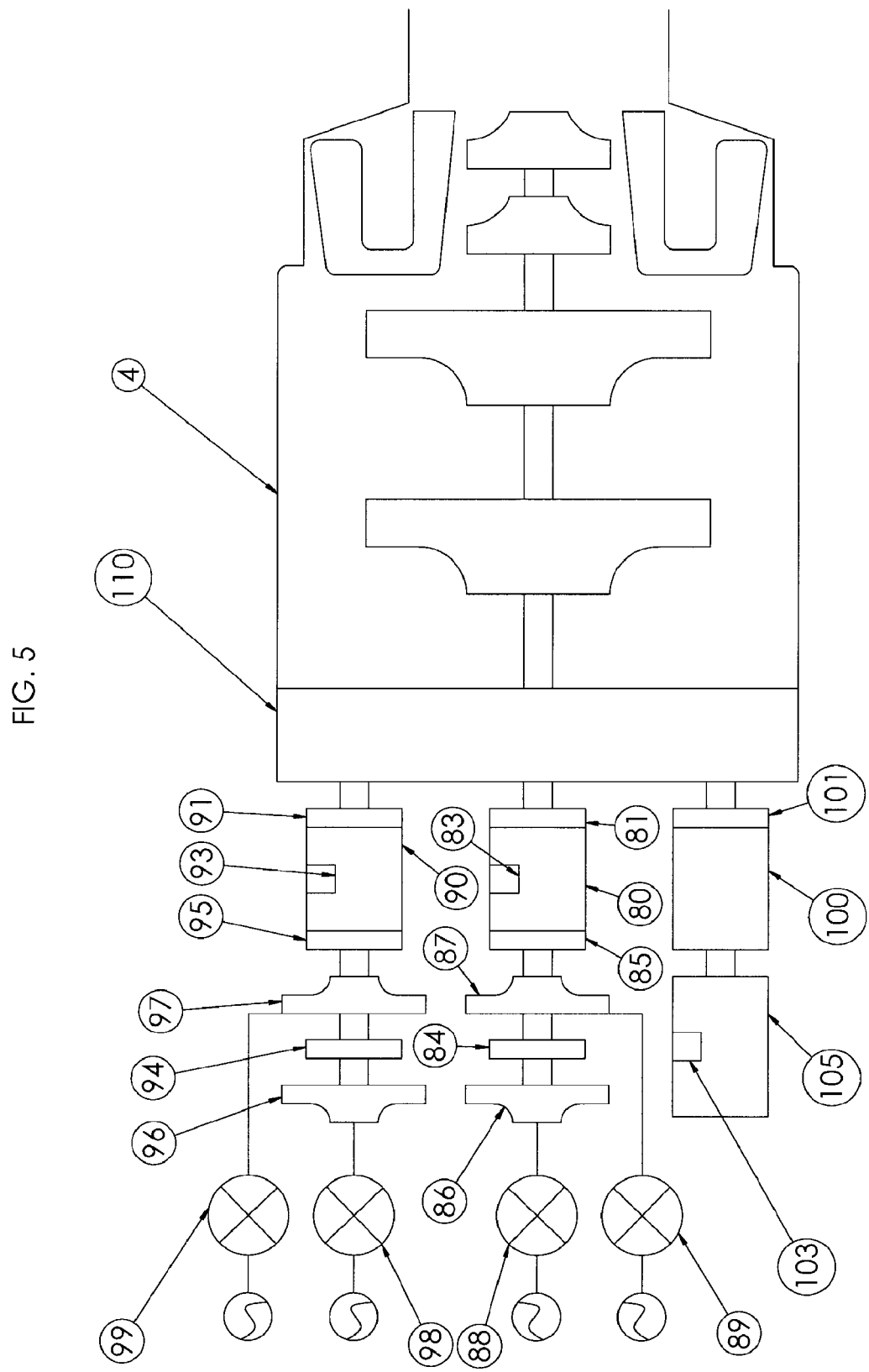
FIG. 5 is a schematic representation of an auxiliary power unit (APU) including the new accessories added to APU gearbox components according to the present invention.

FIG. 5 shows, as part of the invention, that the APU generator 80 is provided with clutches 81 and 85, a cranking pad 83, an air turbine 87 and its air valve 89, and air compressor 86 fitted with a clutch 84 and air valve 88. As part of this invention the APU hydraulic pump 90 is provided with clutches 91 and 95, a cranking pad 93, an air turbine 97 and its valve 99, and air compressor 96 fitted with a clutch 94 and an air valve 98. Clutches 81 and 91 can be used to disconnect the APU generator 80 and the APU hydraulic pump 90, respectively, from the APU gearbox 110 when needed, though normally the clutches are engaged and the APU generator 80 and APU hydraulic pump 90 are connected to the APU gearbox 110. Clutches 85 and 95 can be used to connect the APU generator 80 and the APU hydraulic pump 90 to turbines 87 and 97, respectively, when needed, though normally the APU generator 80 and the APU hydraulic pump 90 are disconnected from turbines 87 and 97, respectively. Clutches 84 and 94 can be used to connect the compressor 86 and the compressor 96 to turbines 87 and 97, respectively, when needed, though normally the compressor 86 and the compressor 96 are disconnected from turbines 87 and 97, respectively As part of the invention, the APU oil pump 100 is connected to the APU gearbox 110 through clutch 101, and the APU fuel control unit (FCU) 105 is fitted with a cranking pad 103. The APU oil pump 100 and the FCU 105 are driven by the same shaft as in certain APU's. Clutch 101 is engaged for normal operations.

All the clutches and air valves are controlled by switches located in the cockpit (can be controlled manually if used only on the ground. The clutches and the air valves operate on direct current (DC) that can be supplied in flight even during flight abnormal situations and emergencies.

In case of emergency and flight abnormal situations the operations of the clutches (connection and disconnection) and the air valves are automatic in order to reduce pilot's workload especially during critical phases of flight. In addition to the test and troubleshooting, the cranking pad or the turbine can be driven to flush the hoses of gearbox component and the related system if there is internal failure of this component, or purge the component and its hoses especially after the installation of this component in the engine in order to avoid cavitation (mainly the EDP). If there are some doubts about a probable internal damage in certain gearbox component particularly if there are some metal particles in filter, the cranking pad or the turbine of this component can be driven to check if there any wrong or strange noise during the rotation of this component, after the disconnection of this component from the gearbox using the clutch. The cranking pad can be also used as an access port or from other access port(s) in the component (suggested access ports) for borescope inspection of the gearbox component to see the extent of damage and wear limits if there is presence of metal particles in the filter/chip detector, strange noise during the rotation of this gearbox component, for scheduled maintenance or shop maintenance. The cranking pad can be also used for the test of the component in the shop maintenance.

The engine 3 is not fitted with one dedicated starter as the opposite of the current engines. The IDG 30, the EDP 40, and the compressor 112/turbine 117 are used and considered as the primary starters on the ground (pneumatically powered by turbine) when they are provided and driven by the APU air (primarily), air compressor 86 and 96 or ground pneumatic cart (if the APU 4 is not operative). The IDG 30 can also be driven electrically (primarily) if this component is starter-generator, and if so it will be considered a dedicated starter since it will operate electrically and pneumatically. Driving the IDG 30, EDP 40, fuel pump 50/HMU 55, oil pump 60 (here are considered as standby starters) by their respective cranking pad or by air compressor outlet for engine start or motoring should be considered and performed as standby procedure (necessitates to open engine fan cowls 121 and reversers cowls 122 and the use of a motor or an air compressor outlet) if none of the 3 primary starters cannot be used and driven by the turbine using APU air (primarily), compressor 86 and/or 96, or ground pneumatic cart (it is unlikely that all these devices cannot be available and used). It is also possible to use the engine gearbox cranking pad 7 as a standby starter when it is driven by a motor through an access door instead of opening the engines cowls during engine start.

A coupling or quick attach/detach (QAD) adaptor can be used to attach the air turbines and the air valves to their respective components in order to facilitate the removal and installation of the turbines, compressors, and the valves. For ease of maintenance, turbines, compressors, and the air valves added to certain engine gearbox and APU components are all interchangeable.

On the ground, an air compressor outlet is temporarily connected to a test port (not shown in the drawings) of a turbine or any type of motor or driving device may be connected to the cranking pad to drive the associated gearbox component. The flow of compressed air to a turbine or the speed of the motor may be varied to simulate different phases of engine operation (e.g., to increase or decrease the speed of the engine gearbox component or APU gearbox component).

Various utilities may be added to the aircraft to facilitate the application of the methods described herein, improve troubleshooting and testing, and generally assist with aircraft maintenance. These utilities are easily accessible from ground level and are used mainly by the line maintenance crew to ensure efficient and rapid troubleshooting and testing in order to reduce aircraft turn-around time.

Electric outlets supplying 28 VDC and 115 VAC that can be provided to power an electric motor to drive the cranking pads of gearbox components or an electrical air compressor for engine and APU tests and troubleshooting. It is possible also use these electrical outlets to supply electricity to engine test sets or a borescope apparatus), to provide light for the engine maintenance at night, to power washing machines to wash the compressor, engine or engine cowling, and so forth. For increased safety, these electrical outlets must be energized only when the aircraft is on the ground and must be controlled from a switch in the engine compartment.

1) Integrated Drive Generator (IDG) and IDG System:

The IDG 30 is already fitted with a built-in clutch 31 called the disconnect mechanism in existing IDG's. In the following scenarios the IDG 30 is presumed to be working normally, unless otherwise specified, and is fitted with: two clutches (31 and 35), cranking pad 33, and turbine 37 provided by air through air valve 39 as illustrated in FIG. 4. The IDG 30 can be a starter-generator (if so it will be interchangeable with APU starter-generator 80), but it is assumed here that the engine 3 is fitted IDG And cooled by fuel and air. During normal operation of the engine 3 and the IDG 30, the IDG 30 is connected to the gearbox 20 and is disconnected from the air turbine 37. Six scenarios are described:

1.1 IDG Ground Test and Use:

In order to test or troubleshoot the IDG 30, only the IDG 30 is driven, instead of running the entire engine. The IDG 30 is disconnected from the gearbox 20 using the clutch 31. By using the clutch 35, IDG 30 is connected to the turbine 37, which will be supplied with pressurized air either by an air compressor outlet (temporarily connected) through a turbine test port or by the APU through air valve 39 (if the aircraft is outside the hangar). The turbine 37 in this configuration drives only the IDG 30 without driving the gearbox 20. The IDG 30 then turns and oil is able to circulate through the IDG system. Testing and troubleshooting of the IDG 30 or IDG system can now be performed without running the engine 3.

When the aircraft is on the ground it is also possible, after disconnecting the IDG 30 from the gearbox 20 using the clutch 31, to connect a motor to drive the cranking pad 33. The cranking pad 33 will drive only the IDG 30, making it possible to troubleshoot and test the IDG 30 and the IDG system without running the engine 3.

The IDG system oil will not become hot because of the typically short duration of the test. But if a test of longer duration is required, for both methods mentioned above the IDG oil may be cooled by the following technique (if the IDG air/oil cooler is not fitted with an IDG cooler air valve):

A small fan is placed in the back of the IDG air/oil cooler, so that air passes through the cooler in a direction preferably opposite to that of air flow with a normally operating engine. Airflow in the same direction as that generated by a normally operating engine may also be used, if necessary, depending on ease of access and the amount of available space around the IDG air/oil cooler in a given model of engine. Besides cooling the IDG oil, this technique has the added benefit of blowing accumulated debris and dirt from the fins of the cooler thereby improving the cooler's performance (mainly during flight). The fan is powered, for example, from the auxiliary electrical outlets that have been suggested as additions to the inside compartment of the engine 3. Another advantage that ensue from this invention is described in the following paragraph:

This procedure will allow better schedule reliability at airport gate and reduced aircraft turn-around time (also valid for other engine/APU components and systems), because according to the new method, the technicians will perform the troubleshooting and the test at the airport gate without towing (towing back and forth the aircraft at slow speed is time consuming especially in congested airport) the aircraft from the airport gate to an engine run-up area (or any remote and clear place if allowed), without running the engine while the ramp personnel are working around and inside the aircraft. In addition there is no need to wait for a clearance from the ATC (air traffic control) to tow back and forth the aircraft from the gate until the run-up engine area.

It is also possible to produce electric power for aircraft ground use instead of the use of the APU or the GPU (ground power unit) while driving the IDG 30 (during aircraft turn-around time at airport gate or aircraft maintenance inside the hangar) by a motor through the cranking pad 33 or air compressor outlet through the turbine 37 (preferably with an air compressor outlet because the turbine discharge air may be used). The same cooling procedure performed during IDG ground test will be executed to provide electric power on ground. This method will reduce the fuel consumption, noise, and emissions gas.

1.2 The Use of IDG as Starter in the Ground:

To ensure that the IDG 30 will provide the necessary torque (as starter) to the engine gearbox 20 during starting or motoring only, the generator (GEN) switch is turned off.

The IDG 30 is connected to the air turbine 37 via a clutch 35. The turbine 37 is powered by APU air (as a primary source and in the normal mode) supplied through the air valve 39 or from a ground compressor cart as secondary source if the APU 4 is not operating. If not the ground crew can drive the air turbine 37 by connecting an air compressor outlet to the test port of the air turbine 37 to drive the engine 3 through the IDG 30 and the gearbox 20 (in such case the IDG 30 is used as standby starter). The IDG 30 drives the engine 3 through the gearbox 20. When the engine 3 reaches self-accelerating speed, the turbine 37 is disconnected from the IDG 30 using the clutch 35. Using the IDG 30 and the EDP 40 (similar method as the IDG 30) as starters simultaneously will improve the engine start at high altitude airport and during hot weather The IDG 30 may be used alternatively (especially if the turbine 37 cannot be provided by APU 4 or the ground compressor cart is not available) as standby starter on the ground. This is accomplished by driving cranking pad 33 with a motor, which in turn drives the gearbox 20 and the engine 3. When the engine 3 reaches its self-accelerating speed, the motor is disconnected from the cranking pad 33.

The IDG 30 can also be used to motor the engine 3 without cool down periods either using the turbine 37 or the cranking pad 33 (it is preferable that the turbine 37 is driven by APU air to do not open engine cowls). If the engine 3 is motored for an extended length of time (usually it is not the case) IDG oil temperature may rise (the IDG oil is already cooled by the fan air; but it may not need more cooling). But if this occurs, the fuel can be used to cool the IDG oil by following this method:

The engine start lever is placed in the idle position. The circuit breaker (CB) of the fuel spar shutoff valve 64 is pulled. The engine start lever is then moved to the cutoff position. The fuel spar shutoff valve 64 will stay open and the high-pressure shutoff valve (HPSOV) 66 will close. With the aircraft boost pump switches in the ON position, the fuel will cool the IDG oil in the IDG oil/fuel cooler 54 in addition to the IDG oil being cooled in the IDG air/oil cooler (not shown in the drawings) by airflow provided by the engine fan, so it will be possible to use the IDG 30 as an engine starter without requiring cool-down periods (as it is necessary for the normal engine starter). This procedure will also be used to cool engine oil in the fuel/oil heat exchanger 56 (the fuel cooling procedure will used a lot in the next paragraphs) since the fuel goes through this exchanger 56.

If the cockpit is fitted with IDG oil temperature or IDG oil overheat indicators (as in some CSDs in older aircraft), this procedure can be applied as soon as abnormal indications are noted in the cockpit.

1.3 In-Flight Engine Shutdown:

It is assumed that the IDG 30 was operating normally before the in-flight engine shutdown. Even though the engine 3 will windmill after shutdown, the IDG 30 will turn slowly and drop offline (usually this happen when the N2 speed decreases below idle speed, the generator of the IDG 30 trips off). For the present engines the IDG 30 will not provide electricity during windmill. If the aircraft was dispatched with one electric generator inoperative (as it is allowed in the MEL: minimum equipment list), this may affect the twinjet since this aircraft will divert with single engine operative with many electric load shed and without redundancy. To avoid this and other problems and provide standby electric power, IDG 30 is disconnected from the gearbox 20 using a clutch 31 and connected to a turbine 37 using another clutch 35. The air valve 39 will provide air from many air sources (engine bypass air, ram air, APU 4, operating engine(s), compressor 112, or compressor compressors 84 and/or 96 to the turbine 37, which will drive the IDG 30. Depending on the situation, and the aircraft systems' need for air, the air input to valve 39 may be taken from any appropriate air source(s) to drive the turbine 37 faster and therefore cause the IDG 30 to produce more back-up electric power, without affecting the kind of power required by the APU and needed by the aircraft. Depend on altitude the standby power generated may be less than the normal power output of the IDG 30 (when the engine is operating). For example, it could be used for backup power for the remainder of a long-haul twinjet flight (after driftdown) if the airport of destination is not far away from a diversion airport particularly if the APU does not start (some APU's may not start after being "cold soaked" after long flight). This procedure can also be used whether the APU starter-generator 80 is faulty or not, but mainly after precautionary engine shutdown (high EGT, low oil pressure, etc.) where the IDG standby power will be provided for instruments and devices required for continued safe flight and landing, and to allow the flight crew to cope effectively with adverse operating conditions (without shedding certain electrical load from the aircraft as in the present aircraft in such case). Following this procedure will also provide a useful back-up power, since aircraft will loss all electric power after engines flame-out due to the fuel depletion (caused by fuel mismanagement, leakage, or fuel contamination): in such cases the relight of engines is not possible (APU 4 cannot be started also), so the standby power of all IDGs (APU startergenerator 80 included and operating in standby mode: driven by turbine as engine IDG) will be very useful in addition to battery power. In other cases like volcanic ash, heavy rain/ hail, strong turbulence, birds strike, or lightning (some of these problems can also cause unsuccessful APU start); the restart of engine(s) is possible (but not sure) and should be attempted mainly after all engines flame-out to assure a safe flight and landing. If the engines fail to restart, the standby power produced by all IDGs will be very useful, and the APU will provide the remaining power needed (either it is hydraulic, pneumatic, or both). Even if the aircraft (as in certain current aircraft) is fitted with the RAT (ram air turbine), its electric power is be very limited because the power of the RAT will be shared (for certain aircraft) to provide also hydraulic power. Besides in the flare, the RAT is not efficient. Using this new method (utilizing the turbine 47) will provide the necessary standby power without the use of the RAT. Certain current engines are fitted with two generators in each engine (IDG and back-up IDG) for more redundancy in the event of a failure of one generator, but in case of engine shutdown both generators are useless. Providing at least one common or shared turbine (with the added accessories) between the two generators will be useful in case of the failure of one the generators or engine shutdown: because it is possible to use the other generator by driving the turbine (standby mode) and also disconnecting the failed generator from the engine gearbox. Similar shared turbine (at least one turbine to ensure more redundancies) can be used in more-electric aircraft (MEA) where two starter-generators are installed per engine and APU.

During extended engine windmill episodes (such as may occur during ETOPS flights), the IDG oil would be cooled by engine bypass air and fuel (mainly when the turbine 37 is supplied with two air sources or more) by applying intermittently the fuel cooling procedure mentioned in paragraph 1.2.

1.4 Engine Fire:

In this situation and according to this invention the engine 3 is shut down IDG 30 is disconnected from the gearbox 20 using the clutch 31 to avoid the circulation of oil in the IDG system in order to decrease the risk of fire spread. An oil leakage from IDG 30 or its related system can initiate an engine fire or can exacerbate an existing fire. Whether or not the pilots observe an IDG 30 anomaly in the cockpit along with an engine fire alarm, and whether or not the fire is related to a possible IDG oil leakage, stopping the oil circulation in the IDG 30 is a good precaution against fire—the same way that the flight operations manual recommends shutting off fuel, air, hydraulic fluid and electricity in case of an engine fire (in the present engines the flight manual does not recommend to disconnect the IDG 30 during engine fire) to increase the efficiency of the fire extinguisher. Because the engine 3 is shut off in case of an engine fire, the IDG 30 is no longer on-line (the generator trips but the IDG 30 is still turning even tough at low speed because of the windmill and without providing electricity), and it is not necessary or desirable to allow a flammable substance, IDG oil, to continue circulating through the IDG system during engine fire. In such case, the aircraft will usually be diverted to the nearest airport and it is preferable (according to this invention) to disconnect the IDG 30 from the engine gearbox 20 as a precaution against fire.

In some situations the risk is increased with an extended diversion, such as long ETOPS flights 207 minutes) or long flight in quadjet, it is possible to provide a standby electric power for a safe diversion and landing. In such case the engine 3 generally is shut down and the engine fire extinguisher is activated. After waiting a period of time to let the engine 3 cool down (in order to dissipate heat and avoid the possibility that the fire will reignite), it may still be possible to use IDG 30 to generate standby electrical power (if needed or as redundancy) with engine 3 shutdown, if this component was operating normally before the engine fire, by following this method: IDG 30 is disconnected from the engine gearbox 20 using the clutch 31. The IDG 30 is connected to air turbine 37 using clutch 35 and is then driven by this air turbine. Any appropriate combination of air sources (engine bypass air, ram air, APU air, operating engine, compressor air 112, or compressor air 86 and/or 96) is supplied to the air turbine 37 through the air valve 39. During engine windmill, the IDG oil is cooled by engine secondary airflow through the IDG air/oil cooler (not shown in the drawing). After the engine fire warning switch is stowed to its normal position (IN position and the engine 3 is still shutdown), the IDG 30 will thus produce standby electrical power for the remainder of the diverted flight, allowing the APU 4 (if operative) to be used primarily to provide the more needed power (pneumatic, hydraulic, or electric). This will be an advantage for extended diversion (207 minutes) since this back-up power will allow a safe diversion and landing the altitude.

For other aircraft which are certified for an ETOPS diversion time of 180 minutes or less, this procedure may still be useful, as it increases the safety margin for continued flight, allowing (for example) more flexibility in choosing a secondary airport if the nearest airport is closed or is not suitable for landing. It may be desirable or necessary sometimes to place the IDG back online after an engine fire even in if the diversion time is 180 minutes or less. This would be the case, for example, if the start of the APU 4 were unsuccessful mainly if the APU get "cold soaked" for long time. The above procedure is to be used only when the pilots have a definite need for standby electrical power and after the fire extinguisher has been activated and the engine has been allowed to cool.

Since the IDG 30 in the present engines is already fitted the clutch 31, it will be beneficial that the pilot will disconnect the IDG 30 from the engine gearbox 20 to avoid the circulation of the oil in the IDG system in case of engine fire (reduce the risk of engine fire).

1.5 The Use of the IDG 30 as a Starter in Flight:

To ensure that the IDG 30 will provide the necessary torque (as starter) to the engine gearbox 20, the generator (GEN) switch is turned off during engine flight restart. We can use the IDG 30 as a starter in flight if the engine 3 is out of windmill start limits (in case of engine flame-out) and the restart attempt is not successful, by following this procedure:

The IDG 30 is connected to a turbine 37 using a clutch 35. The engagement between the turbine 37 and the IDG 30 will be smooth because, during engine windmill, the IDG 30 is turning at slow speed. There will also be no damage to the clutch 35 (no "crash engagement"). The turbine 37 will be provided with any combination of air sources (engine bypass air, ram air, APU air (if the APU 4 is operating), bleed air from operating engine, or compressed air from the compressor 86 and/or 96, air from the compressor 112) through the air valve 39. The turbine 37 drives the engine 3 through the IDG 30 and the gearbox 20. After the engine 3 reaches self-acceleration speed, the air valve 39 is closed and the turbine 37 is disconnected from the IDG 30.

To effect a rapid recovery from engine flame-out and avoid diving the airplane (to increase N2 for the restart) more air sources can be used to power turbine 37. In this way, more torque is delivered to engine gearbox 20 in order to relight the engine 3 and speed up the engine starting; usually the in-flight restart takes more time because of low air density at high altitudes or low engine speed during low aircraft speed and low altitudes especially for the present high bypass engines (less airflow for the engine core to speed up the N2, the great part of the fan absorbed air goes for the engine bypass air).

If the APU 4 is not operating or cannot be successfully started in flight (to provide a compressed air for the restart) and the torque of the IDG 30 is insufficient to effect an engine start, the EDP 40 can connected to the turbine 47 in the same manner as IDG 30 to assist the IDG 30 and provide more torque for an engine in-flight restart. The IDG 30 and the EDP 40 are used in tandem (with generator switch and EDP switch turned off) for quick recovery from all engines flame-out if caused by heavy hail/rain, strong turbulence, volcanic ash, etc. These conditions can affect all the engines of the aircraft at the same time and even the APU, and therefore more than one engine may flame out and need to be restarted quickly and without diving the aircraft (that's what pilots usually do in such case to increase N2 speed for the restart). When the engine 3 successfully starts and becomes autonomous, the respective turbines (37 and 47) are disconnected from the IDG 30 and the EDP 40 using the clutches (35 and 45, respectively), and the air valves (39 and 49) are closed. By following the same method as the IDG 30 and EDP 40, the compressor 112 (through the turbine 117) can also be used as starter to drive the engine 3 through the engine gearbox 20.

In all engines flame-out even the auto-start system (a system installed on the recent engines) will not work when using assisted restart in certain situations (using engine bleed or APU) if a current aircraft is dispatched with start valve 28 operating only manually. In the same event the auto-start system will not work also if APU air (in current APU) is not available or not enough for the starter 21 (APU inoperative or fails to start) and cannot provide the adequate torque for the engine 3 especially during low N1 speed in descent. In addition the starter (in the current engines) may overheat and damage after successive start attempts if using the auto-start system (the auto-start system keeps trying to start engine if the start is not successful), at the opposite of the IDG 30, EDP 40, and turbine 117/compressor 112 that don't require cool down periods when these components are used as starters. But using these new methods preferably combined with auto-start system will improve the engine restart even all engines restart, because the auto-start will detect earlier any engine flame-out.

As well as providing more torque to the engine 3 (providing the necessary compressed air flow to the combustor 15), the simultaneous use of the IDG 30, the EDP 40, and the compressor 112 as starters (after all engines flame-out) increase the chance of a successful engine restart by turning fuel pump 50 faster; this improves the atomization of the sprayed fuel into the engine's combustor 15. In the event of total loss of electric power (all engines flame-out and APU not operative) it is possible to use in one engine (for example the left engine in a twinjet) the IDG 30, the EDP 40, and compressor 112 as standby devices to provide hydraulic, electric, and pneumatic back-up power to maintain the control of the aircraft (these 3 components are disconnected from gearbox 20). The standby electric power can supply aircraft fuel boost pump (at least one pump for each engine), ignition and fuel cross-feed valve also especially in ETOPS flights, so the right engine will be supplied by pressurized fuel and ignition and restarted by the use its own IDG 30, EDP 40, and the compressor 112 as starters. Once the right engine is operative, the left engine is restarted through the use of its own IDG 30, EDP 40, and compressor 112 after connecting these components to the gearbox 20. If all engines flame-out occur at lower altitudes below fuel suction or gravity ceiling, all engines can be restarted simultaneously using the IDG 30, the EDP 40, and the compressor 112 as starter. At the opposite of the current aircraft mainly at high altitudes where the engine fuel suction feel is limited (this will cause fuel pump 50 cavitation), in addition the fuel pump 50 is turning at low speed especially in high bypass engines (driven by HP compressor 11) when engine is windmilling, this can also affect more engine fuel suction feed, therefore the pilots will descend to the gravity fuel ceiling.

1.6 The Use of the IDG 30 in Case of External or Internal IDG Failure:

If the IDG 30 is not fitted with a thermal disconnect mechanism and the IDG 30 fails in flight without any indication of internal or mechanical failure in the cockpit, the pilot should disconnect the IDG 30 from the gearbox 20 using the clutch 3; connect the air turbine 37 to the IDG 30 using the clutch 35 to power the IDG; and open the air valve 39. Since the engine 3 is still operating, it is preferable that it provides air to the turbine 37, which will drive the IDG 30 (the turbine 30 may still use other air sources). If the IDG 30 appears to be functioning normally at this point, it means the failure was external. In this case, the IDG 30 can still be used by powering this component with a turbine 37. The IDG 30 can now be utilized as standby device to provide back-up electrical power and also as tool to ascertain the source of failure (it could be the failure of the IDG output shaft, the splined drive in the engine gearbox 20, or the clutch 31). The IDG 30 can still be used even there was a failure in the gearbox 20 or in the tower shaft (rare occurrence, however). The air used to turn the turbine 37 represents a load for the operating engine 3, but it will be compensated by the disconnection of the IDG 30 from the engine gearbox 20, which relieves the load from the HP compressor 11. The IDG oil is cooled normally (with fuel and air) because the engine is operating. The turbine discharge air may be used and compressed by the compressor 112 if needed for aircraft systems.

If the IDG 30 is not working after using the above procedures, it indicates that the failure is internal and the turbine 37 should be disconnected. But if the IDG 30 is fitted with a thermal disconnect device, as in some aircraft, it is difficult to know if the failure is external or internal, especially if the cockpit is not outfitted with IDG instrumentation or warning indicators. If the IDG is fitted with a thermal disconnect device, the pilots should assume that the cause of the IDG 30 going offline was due to internal overheating, and they should not use the turbine 37 to drive the IDG 30 as a precaution to avoid further damage to the IDG 30. In case of the IDG 30 is not fitted with a thermal disconnect, disconnection of the IDG 30 from the gearbox 20 will relieve load from the engine, lower fuel consumption, and avoid further damage to the IDG 30. For the present engines, it is not possible to use the IDG 30 if the failure is external, besides it is difficult to find out if the failure is external or internal. Using information from engine through ACARS (Aircraft Communication And Reporting System) can be useful in such case and in other flight abnormal conditions or emergency in conjunction with the use of the new accessories.

2) Engine Driven Pump (EDP) and EDP System

Figure 6:
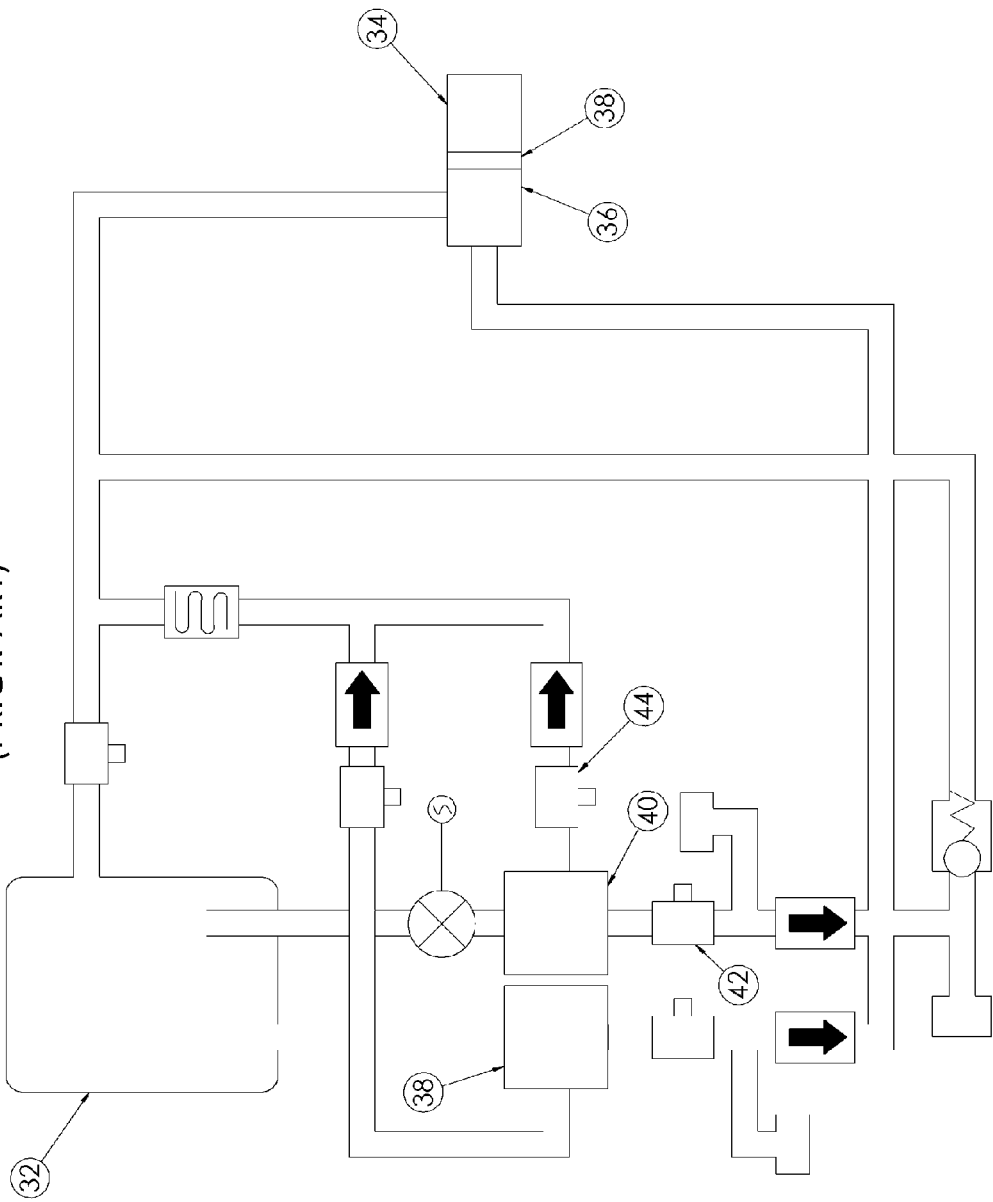
FIG. 6 is a schematic representation of an aircraft hydraulic system.

During normal operation of the engine 3 and the EDP 40, the EDP 40 will be connected to the engine gearbox 20 and disconnected from the air turbine 47. In the following scenarios, the EDP 40 is assumed to be working normally unless otherwise specified. The EDP 40 is fitted with 2 clutches (41 and 45), a cranking pad 43, and turbine 47, which is provided by air through an air valve 49 as in FIG. 4. The aircraft hydraulic system is illustrated in FIG. 6. There are seven scenarios:

2.1 EDP Ground Test and Use:

The EDP 40 can be driven alone without running the entire engine 3. The following two methods can be used:

In the first method, the EDP 40 is disconnected from the engine gearbox 20 using the clutch 41 and then the EDP 40 is connected to the air turbine 47 using the clutch 45. Next, compressed air is supplied to the air turbine 47 either by the APU 4 (used when the aircraft is outside the hangar or is at the airport gate) through the air valve 49 or by the air compressor outlet (connected temporarily) through the air turbine test port (not shown). The air turbine 47 will drive the EDP 40 only. As the EDP 40 turns, hydraulic fluid circulates through the EDP system and aircraft hydraulic system. Testing and troubleshooting can thus be performed on the EDP 40 and EDP system (even aircraft hydraulic system) without running the engine 3.

Alternatively, after disconnecting the EDP 40 from the gearbox 20 using the clutch 41, the EDP 40 can be driven by attaching any type of motor to the cranking pad 43. The cranking pad 43 will drive the EDP 40 only, so testing and troubleshooting can be performed on the EDP 40 and EDP system without running the engine 3.

According to this invention, driving EDP 40 by a motor or compressed air (through turbine) after disconnecting it from the gearbox 20 will provide hydraulic power for the ground test and troubleshooting of the EDP system and aircraft hydraulic system inside the hangar (even if the aircraft is lifted on jacks) and at airport gate instead of the use of the ground hydraulic cart or running the engine. In the present aircraft even with the use of the ground hydraulic cart, it is not possible to perform the test or the troubleshooting of certain components of the hydraulic system like the low pressure switch, the pressure and case drain filters, and return filter module of the EDP system (these components are not supplied by the hydraulic power provided by the ground hydraulic cart) unless the engine 3 is running or at least it is motored.

In some present aircraft, while performing leak check on certain aircraft hydraulic components, these components are not supplied by a sufficient hydraulic pressure, when the aircraft is inside the hangar or at the airport gate (the EDP 40 is not turning because the engine 3 is shutdown) The leak check will be not properly performed (the leak will not be detected) if the hydraulic system is powered by the electric driven pump 38, which delivers low hydraulic flow compared to the EDP 40. Usually this will necessitate running the engine 3—According to this invention, when the airplane at the airport gate or inside the hangar (even with aircraft lifted on jacks), it is possible to drive the EDP 40 (disconnected from the engine gearbox 20) by the cranking pad 43 or the turbine 47 to generate the necessary pressure and flow to perform the leak check, without running the engine or using the ground hydraulic service cart.

2.2 Use of the EDP 40 as a Starter on the Ground:

To ensure that the EDP 40 will provide the necessary torque (as starter) to the engine gearbox 20 during starting or motoring only, the EDP switch is turned off. The pilot or maintenance crew can use the EDP 40 as starter, without the cool down periods required for the present starters (starter operation limitations), since the EDP 40 is cooled and lubricated by EDP case drain hydraulic fluid in the fuel/hydraulic heat exchanger (this exchanger is immersed in the fuel tank). The pilots should connect the air turbine 47 to the EDP 40 using the clutch 45; so the gearbox 20, the EDP 40, and the air turbine 47 will be all connected together. The turbine 47 is powered by APU air (as a primary source and in the normal mode) supplied through the air valve 49 or from a ground compressor cart as secondary source if the APU 4 is not operating. If not the ground crew can drive the air turbine 47 by connecting an air compressor outlet to the test port of the air turbine 47 to drive the engine 3 through the EDP 40 and the gearbox 20 (in such case the EDP 40 is used as standby starter. Once the engine 3 reaches self-accelerating speed, the air turbine 47 is disconnected from the EDP 40 using the clutch 45. Using the EDP 30 and the IDG 30 (similar method as the EDP 40) as starters simultaneously will improve the engine start at high altitude airport and during hot weather.

Alternatively the EDP 40 may be used (especially if the turbine 47 cannot be provided by APU 4 or the ground compressor cart is not available) as standby starter on the ground where the ground crew can connect a motor to the cranking pad 43 to drive the EDP 40. The EDP 40 will drive the engine 3 through the gearbox 20. Once the engine 3 reaches self-accelerating speed, the motor is disconnected from the cranking pad 43.

It is also possible to use the EDP 40 to crank the engine 3. If the engine 3 is motored for a long time, the engine oil temperature may rise but not to an extent to affect the engine 3 because there is no combustion in the engine 3; however in this situation, the fuel can be used to cool the engine oil as the same method described above (fuel cooling procedure described in paragraph 1.2) to assure motoring without a cool-down period, if there is an important rise in oil temperature in the cockpit (which is unlikely).

2.3 In-Flight Engine Shutdown:

The EDP 40 in this scenario is assumed to be operating normally before the in-flight engine shutdown. After the engine is shut down and begins to windmill and the EDP 40 keep turning. In the present engines, this leads to a situation in which the EDP 40 delivers low hydraulic power: the hydraulic pressure will reach 3000 PSI (full pressure) but with low hydraulic flow rate which may affect greatly the control of the aircraft (any actuation of a flight control will decrease considerably the hydraulic power, cause slow answers from flight controls, and take a lot of time to recover the total hydraulic pressure). According to this invention, the remedy is to disconnect the EDP 40 from the gearbox 20 using the clutch 41 and to connect the EDP 40 to the air turbine 47 using the clutch 45. Then, through the air valve 49, bypass air (secondary air flow), ram air, air from an operating engine, air from compressor 86 and/or 96, or APU air is supplied to the air turbine 47 to drive the EDP 40. The EDP 40 will then turn faster than before when it was driven by the gearbox 20 during windmill. The air turbine 47 can receive air from a combination of different sources simultaneously so that the EDP 40 will turn even faster. This provides more standby hydraulic power to the aircraft's hydraulic systems than when the EDP 40 was driven by the HP compressor 11, although the power available may be somewhat reduced from what is available when the engine 3 is operating normally. By using the turbine-produced hydraulic power, the flight controls will be more responsive to pilot inputs than they would be without it. This standby hydraulic power from the turbine-driven EDP 40 assists other pump (e.g. electrical driven pump 38 in FIG. 6) in the same hydraulic system to deliver more overall hydraulic power, because the electrically driven pump 38 is producing low hydraulic flow rate (by design compared to the EDP 40), and critically so if the aircraft is entering certain phases of flight in which the aircraft flight controls require more hydraulic power, such as descent, or approach. The standby hydraulic power from the turbine-driven EDP 40, in conjunction with the power of the EDP of the operating engine and the electric hydraulic pumps 38 will assist the aircraft to divert safely to an alternate airport, to choose the most appropriate airport, or even to continue a safe flight to its intended destination, if the destination airport is not far from the alternate airport. The APU hydraulic pump 90 can be used when there is an extra demand of hydraulic power in the approach, as a PTU (power transfer unit), or even if one of the EDPs fails.

This method of producing standby hydraulic power is also useful for long-haul ETOPS routes. Assisted with electric driven pump 38, the EDP 40 can still be used to boost hydraulic power during the long remaining diversion time (180 or 207 minutes for certain aircraft), even if the APU hydraulic pump 90 is faulty or dispatched inoperative.

In case of all engines flame-out and APU not operative, the EDPs 30 (through their turbines that are supplied by bypass air and ram air), electric driven pumps 38 (supplied by standby electric power through the IDGs 30 and APU starter-generator 80), and APU hydraulic pump 90 (its turbine supplied by ram air) will provide the necessary hydraulic power that will supplies the main and the secondary flight controls. Even the speed brakes and the brakes can be supplied by hydraulic power at landing (the aircraft may be fitted with accumulator to store the standby hydraulic power)). In this case it is assumed that the restart of all engines fail because the engines are severely damaged by volcano ash cloud encounter or severe birds strike, otherwise the engines have great capability of restart if they are fitted with these new accessories according to this invention.

At the opposite of all engine flame-out in the present aircraft where the windmilling engines (the EDPs driven at slow speed especially high bypass engines where the core engine is provided by low air flow) and the RAT is not able to provide the sufficient hydraulic power mainly at low aircraft speed when a large input (which means more hydraulic power required) of the main flight controls are required to maintain the control of the aircraft, but especially for the use of the leading and trailing edge devices (assuming the landing gears were manually extended). In addition the landing will be performed with flaps up, and useless reverses and speed brakes, because usually (depend on aircraft) these components are not supplied by the RAT (only the main flight controls are supplied by the RAT). Certain current engines are fitted with two EDPs in each engine for more redundancy in case of a failure of one EDP, but in the event of engine shutdown both EDPs are useless. Providing at least one common or shared turbine (with the added accessories) between the two EDPs will be useful in case of the failure of one EDP, engine shutdown, or engine flame-out: because it is possible to use the other EDP by driving the turbine (standby mode) and also disconnecting the failed EDP from the engine gearbox. The use of the shared turbine (with the new accessories) can be extended as back-up device between two close electric driven pumps or two air driven pumps 2.4 Engine Fire:

For the present aircraft and in case of fire, the hydraulic is shutoff and the EDP 40 may be damaged since it keeps turning without being lubricated by hydraulic. The hydraulic filters (42, 44) (pressure and case drain filters illustrated in FIG. 6) will be also contaminated. If these hydraulic filters are fitted with bypass valve as in some aircraft, this may contaminate the hydraulic system downstream these filters. The maintenance manual requires the inspection of these filters (to check if the EDP 40 is damaged or not) if the EDP 40 ran more than 5 minutes without being supplied by hydraulic.

In the present invention and in case of engine fire, the hydraulic fluid should be shut off and the EDP 40 should be disconnected from the gearbox 20 using the clutch 41. The EDP 40 will be saved because it does not turn, so there is no need for hydraulic liquid to lubricate the EDP 40. The service life of the pressurization solenoid valve will be extended since there is no need to turns the EDP switch to the OFF position, because in this position the pressurization solenoid valve will be energized. As a result, no filters (42, 44) will be replaced, no flush for hydraulic hoses related to the filters (42, 44) will be needed, and no maintenance and testing will be required because of the nonreplacement of these components. Even if some aircraft have pressure filter 42 and case drain filter 44 fitted with a bypass valve, the hydraulic system could not be contaminated. This procedure will be useful if the diversion airport is near because the pilots will land on the nearest airport after an engine fire occurs and the aircraft is not affected by the disconnection of the EDP 40, which is suitable for short time windmill episodes.

But if there is a need for more hydraulic power mainly on certain ETOPS routes diversion time could be 207 minutes, it is possible to bring back online the EDP 40 which will be connected and driven by its turbine 47. After shutting down the engine (because of the engine fire), the use of fire extinguisher, and after a period of time of engine cool down (to dissipate the heat from engine in order to avoid a recurring fire), the EDP 40 can still be used, if this component was operating normally before the engine fire without any decrease in hydraulic quantity and low hydraulic pressure in the hydraulic system. This will eliminate the possibility of a probable leakage in the engine EDP hydraulic system, which could cause engine fire again, the EDP 40 will work normally after the engine fire. The EDP 40 is already disconnected (as mentioned above in case of fire) from the engine gearbox 20 using the clutch 41.

Then the EDP 40 is connected to the air turbine 47 using the clutch 45 such that the EDP 40 is driven by the air turbine 47 which is supplied by air by any appropriate air source(s) like engine primary air, ram air, etc, through the air valve 49. The engine fire-warning switch must be turned to its normal position (IN position and the engine 3 is still shut down) to open the EDP hydraulic supply shutoff valve to provide hydraulic fluid to the EDP 40, which will produce standby hydraulic power for a safe flight and landing. This will be an advantage for long-haul ETOPS routes where the diversion time can last 180 to 207 minutes, where the pilots can still use the EDP 40 and enhance safety if the aircraft is in need of standby hydraulic power. For other aircraft, which have ETOPS diversion time lasting 180 minutes or less, this procedure may allow the aircraft to reach the destination airport, if the diversion airport is not far from destination airport. Thus, this may ameliorate the ETOPS diversion time requirement since the pilots can choose another diversion airport if the nearest airport is closed or not suitable. This procedure will be used only when the pilots are in need of standby hydraulic power and after the engine cools down enough after engine fire and with engine shutoff.

According to this invention and without using the new accessories, it is possible to perform similar procedure (mentioned above) in the current engines to avoid damage to the EDP 40 and contamination of the hydraulic system. After the use of the fire extinguisher and to remedy this problem, the pilots can still limit the EDP 40 damage or save it from damage if they turn the EDP switch to the off position (to improve the cooling of the EDP 40 during 5 minutes of hydraulic shutoff). Then the crew will stow the engine fire warning switch to its normal position (IN position with engine shutdown) and after 5 minutes of engine cool down (if more than 5 minutes the EDP 40 may be damaged), assuming the EDP 40 was working normally before the engine fire and without hydraulic fluid loss. The EDP hydraulic supply shutoff valve will open to provide hydraulic fluid in order to lubricate the EDP 40. The EDP switch is turned on in order to provide a very limited hydraulic power for the aircraft system from the windmilling engine for a safe diversion and landing.

2.5 Loss of Hydraulic Fluid:

In the present engines, the EDP 40 keeps turning without being lubricated by hydraulic fluid. After certain time likely the EDP 40 will be damaged and the filters (42, 44) contaminated (the entire hydraulic circuit will be contaminated if the filters are fitted with bypass valves as in certain aircraft). The maintenance manual recommends checking the pump and the filters, if the EDP keeps turning without hydraulic fluid more than 5 minutes.

According to this invention and in this scenario, he EDP 40 should be disconnected from the gearbox 20 using the clutch 41. The EDP 40 will not turn, so it does not need to be lubricated. This will save the EDP 40 and the pressure and case drain filters (42, 44) from damage. No flush for hydraulic hoses related to the filters will be needed because they will not be contaminated by metal particles, nor will maintenance and testing be required for these components. If the filters (42, 44) are fitted with a bypass valve as in certain aircraft, maintenance crew do not have to flush the entire hydraulic system because the filters will not be contaminated As soon as the low pressure light and a decrease in hydraulic fluid quantity are apparent in the cockpit, the EDP 40 is disconnected and the switch of the electric motor driven pump 38 (of the same hydraulic system as the EDP 40) is turned off to save hydraulic fluid (reserved for the use by the power transfer unit 48 (illustrated in FIG. 6) if the aircraft is fitted with this component). However, the use of the power transfer unit 48 is not always possible, depending on the location of hydraulic leakage (if it related to the pump 34 or to the motor 36 circuit, otherwise the loss of hydraulic fluid will be total, and the power transfer unit 48 will be unusable).

Since the EDP switch is not turn off the service life of the depressurization solenoid valve will be extended, because when the EDP switch is in the off position the solenoid valve will be energized. Moreover, disconnecting the EDP 40 from the engine gearbox 20 relieves load from the HP compressor 11, so fuel consumption will be decreased for the engine 3, and less fire risk mainly near the hot zone of engine (if the leakage is located in the engine EDP system) because the hydraulic supply is shutoff (EDP 30 is disconnected). To remedy partially this problem in the current aircraft, the pilots can turn the EDP 40 and the electric driven pump 38 off as soon as they see low hydraulic pressure and a decrease in hydraulic quantity in order to save some hydraulic fluid in the tank to lubricate the EDP 40 since it keeps turning (if the leakage is not situated in the case drain hydraulic circuit), or may be to use the remaining hydraulic for the PTU if it enough.

2.6 Use of the EDP 40 as a Starter in Flight:

To ensure that the EDP 40 will provide the necessary torque as starter to the engine gearbox 20 during engine flight restart, the EDP switch is turned off. It is possible to use the EDP 40 as a starter in case of engine flame-out if the engine 3 is out of windmill start limits. Engine start can be achieved by connecting the EDP 40 to the air turbine 47 using the clutch 45. During windmill the EDP 40 is turning at slow speed (primarily in high bypass engines, the great part of air bypasses the core engine); therefore, the engagement between the EDP 40 and the air turbine 47 will be smooth (no crash engagement). The gearbox 20, the EDP 40, and the air turbine 47 are all connected together. Then, engine secondary airflow (bypass air), ram air, bleed air from an operating engine, compressed air from the compressor 86 and/or 96, or compressed air from the compressor 112 is supplied, to the air turbine 47 through the air valve 49. The turbine 47 can also be supplied with APU air through the air valve 49 if the APU 4 is operating. The air turbine 47 will drive the engine 3 through the EDP 40 and the gearbox 20. When the engine 3 becomes autonomous, the air turbine 47 is disconnected using the clutch 45 and the valve 49 is closed.

The air turbine 47 may also be powered by a any appropriate combination of air sources mentioned above for a quick recovery from engine flame-out if the airplane is out windmill start limits. If the APU 4 is inoperative or fails to start and the engine 3 has not become autonomous because of insufficient torque or slow acceleration (hung start), the IDG 30 can be used in the same way as the EDP 40 to give more torque to the gearbox 20 to accelerate the engine 3 (with generator switch and EDP switch turned off). The EDP 40 and the IDG 30 can also be used at the same time for quick recovery from an engine flame-out especially during certain critical phases of flight when the cause of engine flame-out affects all engines at the same time (e.g., during heavy hail or rain, strong turbulence, fuel depletion . . . ). When the engine becomes autonomous, the pilots should disconnect the air turbines 37 & 47 from the IDG 30 and the EDP 40 using the clutches 35 and 45, respectively. By following the same method as the IDG 30 and EDP 40, the compressor 112 (through the turbine 112) can also be used as starter to drive the engine 3 through the engine gearbox 20. Using the EDP 40, the IDG 30, and compressor 112 as starter simultaneously will improve the atomization of the fuel because the fuel pump 50 will turn faster (increase fuel pressure) and provide the necessary compressed air flow for the combustion. Using the IDG 30, the EDP 40, and compressor 112 will also improve the fuel flow rate in the engine suction feed line in the event of total loss of electric power or when the APU 4 is the only source of power in the aircraft. A In the event of total loss of electric power (all engines flame-out and APU not operative) it is possible to provide the necessary standby power to maintain the control of aircraft by using in one engine the IDG 30, the EDP 40, and the compressor 112 simultaneously as standby devices to supply hydraulic, electric, and pneumatic but especially to restore fuel pressure and ignition for the restart of the other engine. Once this engine is restarted using its own starters (IDG 30, EDP 40, and compressor 112) and operating, the other engine is restarted after connecting its components to the gearbox 20. A similar procedure can be used for a trijet or quadjet. At the opposite of the current aircraft mainly at high altitudes where the engine fuel suction feel is limited and it will cause fuel pump 50 cavitation and the engines restart may be successful when the aircraft descend to the gravity fuel ceiling.

2.7 Failure of EDP 40 in Flight:

If the EDP 40 fails in flight, the failure could be external or internal. The pilots should disconnect the EDP 40 from the engine gearbox 20 using the clutch 41. Then they should connect the EDP 40 to the air turbine 47 using the clutch 45, and open the air valve 49 to supply air to the air turbine 47 in order to drive the EDP 40. The air can be supplied by any appropriate air combination of air sources. If the EDP 40 is operating at this time, it indicates that the failure is external. If it is not operating, it indicates that the failure is internal. With external failure of the EDP 40, the pilots can still use the EDP 40 as a back-up device and also as a tool to detect the failure of the EDP input shaft, the failure of splined drive in the gearbox, or the failure of the clutch 41. The IEDP 40 can still be used even there was a failure in the gearbox 20 or in the tower shaft (rare occurrence, however).

Therefore, when the failure is external, the EDP 40 can still provide back-up power to continue the flight safely. Since the engine 3 is still operating, it can supply more air to the air turbine 47 (than when windmilling) to provide more standby hydraulic power. Two air sources can turn the air turbine 47 faster, providing more hydraulic power. The bleeding of air from the engine 3 to turn the air turbine 47 represents a load for the engine 3 and it can be offset by disconnecting the EDP 40 from the engine gearbox 20.

If the failure is internal, it could be the result of a problem in the pressurization system of the hydraulic reservoir 32. In that case, the low pressure light in the cockpit will usually blink due to the cavitation of the EDP 40. Sometimes the internal EDP failure could be mechanical. In both cases of internal failure the EDP 40 should be disconnected from the gearbox 20 using the clutch 41, after dismissing the possibility of external failure when the EDP low pressure light comes on in the cockpit. The EDP 40 will stop turning, preventing further damage to the EDP 40, particularly if the remaining flight time is long (e.g., during medium & long-haul flights). The service life of the depressurization solenoid valve will be extended because the EDP switch will stay in the ON position and the solenoid valve will not be energized. The pressure and case drain filters (42, 44) and the related hoses will not be contaminated. Even if these filters (42, 44) are provided with a bypass valve, as in certain aircraft, there are no metal contaminants in the hydraulic components and c system, because the EDP 40 has been disconnected. In case of internal failure of the EDP 40, disconnecting the EDP 40 from the engine gearbox 20 will relieve load from the HP compressor 11, so the fuel consumption of the engine 3 will be reduced. Using information from engine through ACARS (Aircraft Communication And Reporting System) can be useful in such case and in other flight abnormal conditions or emergency in conjunction with the use of the new accessories.

3) Fuel Assembly Pump and Engine Fuel System

Figure 7:
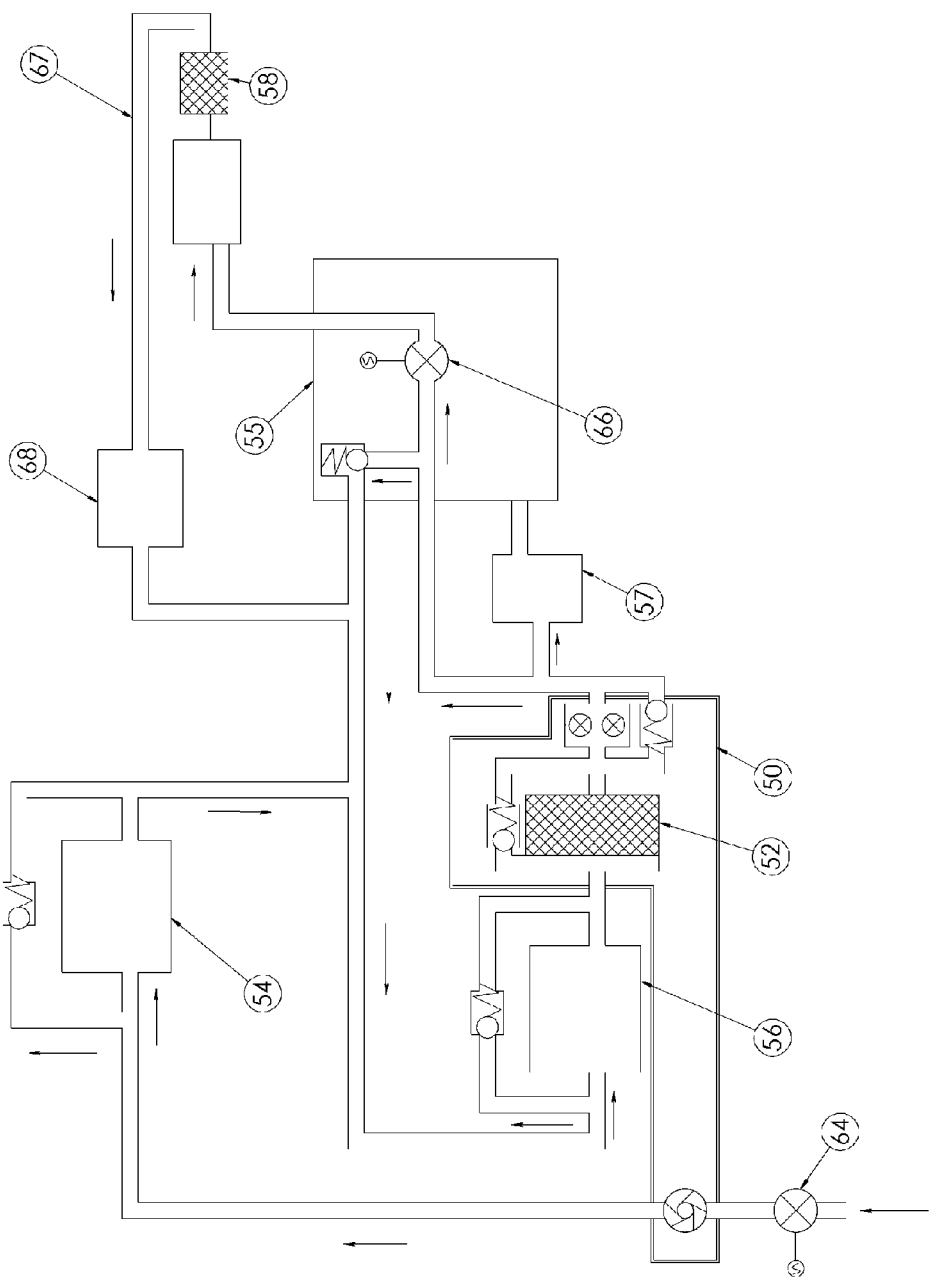
FIG. 7 is a schematic representation of an engine fuel system including an added fuel hose and an added air/fuel heat exchanger for ground test and troubleshooting according to the present invention.

It is assumed that the fuel pump 50 and the HMU 55 are driven by same shaft. During normal operation of the engine 3 and the fuel pump 50, the fuel pump 50 is connected to the engine gearbox 20. The fuel pump 50 and the HMU 55 are assumed to be operating normally. In this invention, the fuel pump 50 is fitted with a clutch 51 (controlled from cockpit) to connect the fuel pump 50 and the gearbox 20. The HMU 55 is fitted with a cranking pad 53 as illustrated in FIG. 4 (but the engine fuel system is illustrated in FIG. 7). The cranking pad can be fitted to the fuel pump 50 instead of the HMU 55, but for ease of accessibility, it is better to utilize the latter arrangement. The air turbine 37 or 47 could be adaptable for the installation to the cranking pad 53 for the fuel system ground test. We have five scenarios.

3.1 Fuel System Ground Test:

According to this invention, it is desirable to drive only the fuel pump 50 and the HMU 55 to test and troubleshoot the engine fuel system instead of running the entire engine 3. The fuel hose that is connected to the fuel nozzles downstream from the filter 58 is disconnected so that the fuel does not flow to the nozzles; also, a fuel hose 67 is added between the disconnected hose (downstream from the filter 58) and the bypass line of the HMU 55 (as illustrated in FIG. 7). The fuel hose 67 will be fitted with an air/fuel heat exchanger 68 in order to cool the fuel during ground testing and troubleshooting. The fuel hose 67 is installed only for the ground test, and it will be removed once the test is completed. The fuel system ground test can be achieved by following 2 methods:

a—The fuel pump 50 should be disconnected from the gearbox 20 using the clutch 51; then, any kind of motor can be connected to the cranking pad 53 to drive the HMU 55 and the fuel pump 50. The fuel pump 50 and the HMU 55 are turning now without running the entire engine 3. The maintenance crew should open the fuel spar shutoff valve 64 and the high pressure shutoff valve 66 (HPSOV) and move the fuel boost pump switches to the ON position. The fuel is now circulating through the engine fuel system except for the nozzles, so the maintenance crew can test and troubleshoot the engine fuel components and system easily and efficiently with the fan cowls 121 and reverser cowls 122 open at the opposite of some tests performed in the current engines where the engine must operate up to 70% N1 to perform leak check with the fan and reverser cowls (121, 122) close.

b—On the other hand, if no cranking motor is available (but an air compressor is available), it is possible to detach the air turbine 47 or 37 from the EDP 40 or the IDG 30 and attach it to the cranking pad 53 of the HMU 55. For that purpose, the turbine 37 or 47 should be adaptable to the cranking pad 53. The fuel pump 50 is disconnected from the gearbox 20 using the clutch 51. Then an air compressor outlet is connected to the installed turbine to drive the HMU 55 and the fuel pump 50. The fuel spar shutoff valve 64 and the high pressure shutoff valve 66 (HPSOV) are opened and the fuel boost pump switches are moved to the ON position. The fuel will circulate through the system, so the maintenance crew can now test and troubleshoot the engine fuel components and system without running the entire engine 3. When the test is finished, the crew reconnects the air turbine 37 or 47 to the IDG 30 or EDP 40.

Testing usually will not last long enough to cause the fuel to overheat. Therefore, with neither method will the fuel become so hot as to affect the lubrication of the fuel pump 50 and the HMU 55. But if the test will last a long time (not usually the case) mainly if the fuel pump 50 turning at high speed this may increase the fuel temperature. The fuel may be cooled by following this method:

The fuel hose 67, which was added to the fuel system for ground testing, may be fitted with an air/fuel heat exchanger 68. The fuel will be cooled by the flow of air (generated by an electric fan) through the fins of the air/fuel heat exchanger 68 (this heat exchanger will not be installed if the test will not last long time). The fan will be temporarily positioned just for the ground test and will be powered through an auxiliary/utility electrical outlet installed in the engine compartment.

Once the test is finished, the fuel hose is reconnected in its original position, and a wet motoring procedure can be used to check the reconnected hose for possible fuel leaks.

It is possible to perform leak test (as a third method) for the fuel system components, which are situated upstream the high pressure shutoff valve (HPSOV) 66 because it will be closed, without disconnecting any fuel hoses by performing the fuel cooling procedure described in the paragraph 1.2.

Another advantage that ensue from this invention is described in the following paragraph:

No ground engine or APU (mentioned in the next paragraphs) run-up for the test/troubleshooting of gearbox components/systems and aircraft systems or to provide electric, pneumatic, and hydraulic power during aircraft turn-around time indicates: less fuel consumption, less gas emissions, and less noise; extended engine and APU time on aircraft, and shop visit at optimum periods. This will permit also increased lifetime and increased mean time between failure for the engine and APU gearbox components: because when the test/troubleshooting of a gearbox component or its system is performed, the others gearbox components from the others systems are not running (the gearbox component is tested separately). So only the gears of this component will be subject to wear during the test. But when the entire engine or APU is running all gearbox components are turning and therefore they are all subject to wear even the gears of the gearbox, the tower shaft, and the engine bearings.

3.2 Use of the Fuel Pump and the HMU as a Standby Starter on the Ground:

If the IDG 30, the EDP 40, and the compressor 112 (through the turbine 117) cannot be used as primary starter, the fuel pump 50/HMU 55 can be used as a standby starter for the engine 3 by driving the HMU 55 via the cranking pad 53 that is driven by a motor. The fuel pump 50 (via HMU 55) will drive the engine 3 through the gearbox 20. Once the engine 3 reaches self-accelerating speed, the motor is disconnected from the cranking pad 53.

By using a motor to drive cranking pad 53, it is also possible to motor the engine 3 and even use both IDG 30 and EDP 40 (or even compressor 112) as starters simultaneously with the fuel pump 50/HMU 55 for a greater speed motoring. It is also possible to disconnect the IDG 30 and the EDP 40 from the engine gearbox 20 if these components are not needed during engine motoring. 3.3 In-flight engine shutdown:

a—It is assumed here that the cause of in-flight engine shutdown is not related to the fuel system. In the present engines and during in-flight engine shutdown, the fuel is shutoff. The fuel will be trapped in the fuel engine system and will become hot (because it is not renewed) mainly during extended windmill, since the fuel spar valve 64 and the high-pressure shutoff valve (HPSOV) 66 are closed. So the fuel pump 50 and the HMU 55 may be affected (not properly cooled and lubricated) mainly during long duration windmill, even though certain HMUs (or other fuel regulator like FCU or MEC) are fitted with windmill bypass valve. This problem concerns also quadjets, trijets since they are allowed to continue the flight to the intended destination (in case of precautionary engine shutdown); and it concerns also long ETOPS flights since the engine could windmill up to 207 minutes in certain aircraft. To remedy this problem (but not efficiently as disconnecting the fuel pump 50 and the HMU 55), the pilots will perform the fuel cooling procedure described in the paragraph 1.2 This procedure will be also useful for the short or medium-length windmill episodes (less efficient during extended windmill in the present engines). This method is better that the one commonly mentioned in flight operations manuals because the presence of partially recycled fuel in the fuel pump 50 and the HMU 55 for their lubrication is better than the trapped fuel (not recycled or renewed, because the fuel spar valve 64 is closed) in these components (as would result if the method mentioned in the flight operations manual were followed). This new method can be applied to present engines and aircraft since it does not require any new accessories to be added to the engine.

b—According to the present invention and in case of in-flight engine shutdown the fuel is shut off. The fuel pump 50 is disconnected from the gearbox 20 using the clutch 51. The fuel pump 50 and the HMU 55 will stop turning, so they do not need fuel for lubrication. By this method the fuel pump 50 and the HMU 55 can be saved from damage, even if the windmilling lasts for hours. The fuel filter 52, IDG oil cooler 54, fuel/oil heat exchanger 56, and the fuel servo heater 57 will not be contaminated. Since the fuel pump 50 and the HMU 55 are disconnected from the gearbox 20, load is relieved from the gearbox 20. The oil pump 60 will turn faster than before, so it provides better lubrication. The pilots can apply this procedure to short/medium windmill episodes, and it is efficient during extended windmill where the fuel (trapped and not renewed) will affect the lubrication and cooling of the fuel pump 50 and the HMU 55 if they are not disconnected from the engine gearbox 20.

3.4 Engine Fire:

There are 2 methods, the first concerns the current engines and does not require the use of the new accessories. This method is better than the one used in the current engines, but less efficient than the second method that requires the use of new accessories:

a—In the present engines and in case of an engine fire (engine shutoff), the fuel will be trapped between the fuel spar valve 64 and the HPSOV 66. So the fuel will become hot during extended windmill as in paragraph 3.2 and may affect the cooling and lubrication of the fuel pump 50 and the HMU 55. According to this invention the pilots should perform the following new procedure to remedy this problem partially in the current engines:

After the use of the fire extinguisher and a period of time to allow the engine to cool down (to dissipate the heat from the engine in order to avoid another fire). The engine fire warning switch is stowed to its normal position (IN position); then the pilots will perform fuel cooling procedure: the engine start lever is placed in the idle position. The circuit breaker (CB) of the fuel spar shutoff valve 64 is opened. Then the pilots move the engine start lever to the cutoff position. The fuel spar shutoff valve 64 will stay open and the high pressure shutoff valve (HPSOV) 66 will close. With the aircraft fuel boost pumps on, fuel will be provided to the fuel pump 50 and the HMU 55 to lubricate these components.

This procedure will be of benefit if the diversion airport is not far, to assure that the fuel will not become hot mainly during-short or medium length windmill episodes. This method is better that the one typically mentioned in flight operations manuals, because partially recycled fuel (so relatively cool fuel) is present in the fuel pump 50 and the HMU 55 for their lubrication as opposed to non renewed fuel circulating in these components (as would result by following the method mentioned in the flight operations manual). This new method can be applied to present engines and aircraft since it does not require any new accessories to be added to the engine.

b—In case of engine fire and according to the present invention, the fuel pump 50 should be disconnected from the engine gearbox 20 using the clutch 51. The pump 50 and the HMU 55 will stop turning because they are driven by the same shaft. The fuel pump 50 and HMU 55 will be saved from damage because they are not turning and therefore do not need fuel to lubricate them. The fuel filter 52, IDG oil cooler 54, fuel/oil heat exchanger 56, and fuel servo heater 57 will not be contaminated by metal particles. This procedure can be applied regardless of the duration of the diversion time.

During take-off and initial climb and in case of engine fire, in the current engines the flight manual recommends to do not shut off this engine until the aircraft will reach a safe altitude, because the engine on fire still produces thrust. According to this invention, it is possible to reach this safe altitude with more safety by minimizing the risk of the spread of engine fire: in such case the hydraulic and the bleed air are shut off (the EDP 40 is disconnected from the gearbox 20 and the engine bleed air is already shutoff during take-off as it is preferable according to this invention, besides in many cases air leakage had caused an engine fire), even the oil can be shut off for a very short time to limit the risk of fire (by disconnecting the oil pump 60 from the gearbox 20). After few minutes the engine is shut down when the aircraft reaches a safe altitude and then the oil pump 60 can be reconnected to the gearbox 20. The EDP 40 can be used in standby mode (driven by the turbine 37) to provide standby hydraulic power. The operations of shutting bleed air, hydraulic, and oil are automated to relieve pilots' workload in this critical phase of flight. The APU 4 is already operating providing electric, pneumatic and hydraulic power, if not it will operate automatically in such case (according to this invention, it is preferable to use the APU 4 from taxiing with engines bleed off to the cruise altitude as it is mentioned in the next paragraphs.

3.5 Fuel Depletion:

The fuel depletion can be caused by fuel mismanagement or leakage. In such case (especially fuel mismanagement or fuel leakage upstream the spar valve 64 when there is still fuel in the engine fuel system) the fuel will be trapped between the fuel spar valve 64 and the HPSOV 66. In the current engines the fuel will become hot during extended windmill as mentioned in paragraph 3.2 and may affect the cooling and lubrication of the fuel pump 50 and the HMU 55. In case of fuel leakage downstream the fuel spar valve 64 or in the engine fuel system, the fuel pump 50 and the HMU 55 are not lubricated. These gearbox components will be damaged during extended windmill. According to the present invention and to remedy this problem, disconnecting the fuel pump 50 from the gearbox component 20 will prevent the fuel pump 50 and the HMU 55, and save the other engine fuel components from contamination (metal particles).

4) Oil Pump and Engine Oil System

The oil pump 60 will include a supply pressure pump and a scavenge pump (driven by the same shaft). During normal operation of the engine 3 and the oil pump 60, the pump 60 will be connected to the gearbox 20. In the present application the oil pump 60 is fitted with a cranking pad 63 and a clutch 61 (as illustrated in FIG. 4) controlled from the cockpit. The air turbine 37 or 47 can be adapted so that it may be connected to the cranking pad 63 for ground testing and troubleshooting.

4.1 Engine Oil System Ground Test:

This invention suggests driving only the oil pump 60 without running the entire engine 3. Two methods may be used:

(a) Disconnect the oil pump 60 from the gearbox 20 using the clutch 61, then connect any type of motor to the cranking pad 63 to drive the oil pump 60. Now the oil pump 60 is turning without the gearbox 20, allowing troubleshooting and testing of the engine oil system without running the entire engine 3.

(b) If no motor is available but an air compressor is available, it is possible to detach the air turbine 37 from the IDG 30 or the air turbine 47 from the EDP 40, then attach it to the cranking pad 63 of the oil pump 60. After connecting the air compressor outlet to the air turbine, the oil pump 60 can be driven by the air turbine. A maintenance crew can now test and troubleshoot the oil system because the oil is circulating in the engine system. This is accomplished without running the engine 3. When the test is done, the maintenance crew removes the air turbine 37 or 47 and then restores it to its original position.

Because the engine 3 is off and the test will not usually take a long time, the oil will not become so hot as to affect the lubrication of the oil pump 60. However, if the maintenance crew notices an unexpected (unlikely) rise in the oil temperature during long test, the oil may be cooled by applying periodically fuel cooling procedure mentioned in paragraph 1.2 and driving the fuel pump 50 through the cranking pad 53 and the HMU 55 with a motor, so the fuel can circulate in the fuel system (most importantly, in the fuel/oil heat exchanger 56 and fuel servo heater 57 in partially closed system where the oil will be cooled by the fuel). Driving separately the oil pump 60 can be used to purge an engine oil system from preservative oil in new installed engine or engine staying inactive for long time or even to warm-up oil during cold soak start engine.

While performing aircraft maintenance when the airplane is grounded inside the hangar and/or lifted on jacks the maintenance crew can anticipate performing test or troubleshooting for engine and APU systems/components (if required) and speed up the maintenance instead of waiting until the aircraft maintenance work is finished and towing the aircraft outside the hangar for engine and APU run-up.

If the maintenance shop technicians are performing engine and/or APU build-up on overhauled/new engine or APU, (usually overhauled/new engines or APUs are not equipped with all components, valves, hoses, etc), they can perform leakage test at maintenance shop for engine and APU components and their related systems by driving the cranking pad or the turbine (certain systems necessitate an external tank and hoses, added temporarily for the test to make a closed system like EDP hydraulic or fuel system)). This will ensure that the engine 3 and APU 4 will not have any possible leakage on engine/APU component or system during engine or APU installation test on the aircraft.

4.2 The Use of the Oil Pump as a Standby Starter on the Ground:

If the IDG 30, the EDP 40, or the compressor 112 (through the turbine 117) cannot be used as primary starters, the ground crew can use the oil pump 60 as a standby starter without cool-down periods, as required for the present starters. By driving the cranking pad 63 with a motor, the oil pump 60 will drive the gearbox 20 and the engine 3. As soon as the engine 3 starts and becomes autonomous, the ground crew disconnects the motor from the cranking pad 63.

It is possible to use the above method along (for a greater motoring speed) with he IDG 30, EDP 40, and compressor 112 (through the turbine 117). This motoring can be used to warm up the oil by driving the oil pump 60 before the engine start during very cold weather in order to improve engine lubrication during engine start. If these components are not needed for the motoring, they can be disconnected from the engine gearbox 20. During long motoring the oil temperature may raise but not to an extent to affect the engine, however if the oil temperature becomes hot (unlikely), the maintenance crew can perform the fuel cooling procedure mentioned in the paragraph 1.2.

4.3 In-Flight Engine Shutdown:

In the present engines, during windmill the oil pump 60 provides low oil pressure, because the gearbox (with all load of the driven components and a shut down engine 3) is turning at low speed mainly in high bypass engines (most of the air flow bypasses the core engine) and high inertia of the HP spool (after the spool down of the engine). This may affect the lubrication of the shaft bearings (especially during extended windmill), probably more N1 shaft bearings if the N1 shaft is turning faster than the N2 shaft (for certain engines during windmill, pilots experienced N1 spool turning faster than N2 spool with zero oil pressure) since the oil pump 50 is driven by the N2 shaft.

b—According to this invention, since the engine 3 is shut down, the EDP 30, the IDG 40, the fuel pump 50, and the HMU 55 are disconnected from the gearbox 20 as mentioned above in the paragraphs 1.3, 2.3, and 3.3 respectively (even the compressor 112 can be disconnected). The gearbox 20 is relieved from the majority of its normal load. The oil pump 60 will now turn faster than before (when all the other components were connected to the engine gearbox during windmill). The oil pressure will increase and the recirculation of the entire oil volume will be faster, which will improve the lubrication of the engine especially during long-duration windmilling episodes in quadjet of trijet since it is permissible to continue the flight to the intended destination after precautionary engine shutdown.

4.4 Engine Fire:

a—In case of engine fire in the present engines, the oil cannot be isolated. The fire could be internal due to a damaged bearing seal, so the circulation of oil in the system may sustain the fire, spread it, and may cause external fire and engine fire alarm. In this type of fire, the fire extinguisher cannot reach the origin or the source of the fire (the fire is not extinguished). If the fire is external, the fire extinguisher can reach the fire source, but it may be not completely effective to extinguish the fire because oil is still circulating and the oil source is not shut off. This is of particular concern in the hot zone of the engine: for example, a leaking oil hose in this zone, or oil leakage onto a hot air duct or line in the engine can produce oil vapor which may cause or sustain an engine fire, especially at low altitudes (below 10,000 ft) where certain internal part in engine and surfaces temperature in the nacelle were highest from high take-off/climb power setting.

b—According to the new method of this invention, all these problems mentioned previously can be remedied. This method consists in isolating the oil in order to avoid the circulation of the oil in the system in case of engine fire. Whether or not a decrease in oil quantity is detected by the pilots along with the engine fire alarm, the oil pump 60 should be disconnected from the gearbox 20 by using the clutch 61, as precaution to shut off the flow of oil. At the very least, the pilots should disconnect the oil pump 60 to shut off the oil flow and stop the source of the fire if they detect a decrease in oil quantity along with the engine fire alarm. According to flight operations manuals (in the present engines), in case of an engine fire the flight crew is directed to shut off fuel, air, electricity, and hydraulic fluid going to the engine in order to stop and reduce the spread of fire. It is notable that the manuals do not call for the shutoff of oil; this may be to avoid damage to the engine (particularly its bearings and gears). Nonetheless, disconnecting temporarily the oil pump 60 from the gearbox 20 is a way to improve flight safety without causing damage to the engine 3. Even if the circulation of oil in the engine oil system is stopped (for short time then restored after), the bearings compartment or cavity and the engine gearbox 20 still contain some remaining oil which can lubricate the bearings and the gears. In case of engine fire the aircraft will divert to the nearest airport and the windmilling engine may face lubrication issues if the oil pump 60 is disconnected during this diversion.

The following method can be used to restore some oil pump 60 functionality for a windmilling engine.

After a period of time of engine cool-down (in order to dissipate the heat from engine 3 to avoid the possibility that the fire will occur again), the oil pump 60 is used if it was operating normally before the engine fire and if it did not sustain any failure or engine oil loss (a decrease in engine oil quantity). This will avoid the possibility of a leakage in the engine oil system that could cause the engine fire to erupt again. To provide better lubrication to the engine, the oil pump 60 is reconnected to the engine gearbox 20. Because the engine 3 is windmilling, the HP compressor 11 is not turning at high speed; therefore, the engagement of the oil pump 60 with the engine gearbox 20 will be without damage (no crash engagement). In this scenario (engine fire) and as mentioned in other paragraphs above (paragraph 1.3, 2.3, and 3.3)), the IDG 30, the EDP 40, the fuel pump 50 and the HMU 55 are driven by turbines, so these components are disconnected from the engine gearbox 20 (which is thereby relieved from their load). The oil pump 60 will turn faster than before, so it will provide better engine lubrication. This will be an advantage for all kind of flights especially ETOPS and long-haul flights because the engine oil can be shut off during an engine fire to assist extinguishing engine and preventing a recurrence of the fire, and yet it can be restored (the oil pump 60 is reconnected) and used for engine lubrication after a period of engine cool-down.

4.5 Loss of Engine Oil System:

According to this invention it is possible to disconnect the oil pump 60 from the engine gearbox 20 using the clutch 51 as soon as a loss of engine oil is indicated by the low oil pressure light and the decrease of oil quantity in the cockpit. This procedure will prevent additional oil loss and will conserve more oil in the gearbox 20 and engine oil sumps. No more oil will circulate through the system. The engine 3 should be shut down as well. Disconnecting oil pump 60 will keep a certain quantity of the remaining oil in the gearbox 20 and the bearings compartment to lubricate the gears and the bearings; the level of lubrication may not be at normal levels, but will be better than would exist with a total loss of oil. Stopping oil circulation can also be a precaution against fire caused by a possible engine oil system leakage or bearings' seal leakage in the hot zone of engine especially after take and climb where bearing compartments and the nacelle temperature will reach a highest level. Disconnecting the oil pump 60 from gearbox 20 can also save the oil pump 60 from damage because a non-turning oil pump does not need to be lubricated by oil; this procedure can additionally prevent contamination of the oil system downstream from the filter. If the oil pump 60 were left turning, the remaining oil in the system may move and push any contaminants through the oil filter bypass valve into the rest of the circuit; of most concern would be contamination of the internal parts of the engine, such as the last chance filters and the oil jets. After oil loss the pilots will land at the nearest suitable airport.

5) The Compressor 112 and the Turbine 117:

Here it is supposed that the engine 3 is fitted with a compressor 112 that is provided with a clutch 111 and valve 118, and a turbine 117 fitted with a clutch 114 and valve 119 as illustrated in FIG. 5. Similar compressor/turbine (same configuration) can be installed on the APU, but in this invention it is assumed only the engine 3 is fitted with these accessories. The compressor 112 will provide pneumatic power whether the engine 3 is operating or not.

5.1 The Use of the Compressor 112 and the Turbine 117 on the Ground:

At the gate (especially during passengers boarding) or in the hangar (for test and troubleshooting) it is possible to provide air for aircraft air conditioning system, if the compressor 112 is disconnected from the engine gearbox 20 through the clutch 111, then the compressor 112 is connected to the turbine 117 through the clutch 114. Using an air compressor outlet the air turbine 117 drives the air compressor 112. After receiving the ambient air and the turbine discharge air through the air valve 118 the compressor 112 will compress this air and provide it for the aircraft systems.

After disconnecting the compressor 112 from the engine gearbox 20 using the clutch 111, it is also possible to drive the compressor 112 by a motor through a belt or any other device and compress the ambient air, which is supplied through the air valve 118. This compressed air is delivered to the aircraft air conditioning/pressurization system.

5.2 The Use of the Compressor 112 and the Turbine 117 as Starter on the Ground:

The compressor 112 and turbine 117 can be used as a back-up starter by the following two methods:

The compressor 112 is normally connected to the engine gearbox 20 using the clutch 111. By using the clutch 114 the compressor 112 is connected to the turbine 117, which is driven by air through an air compressor outlet. The turbine 117 turns the compressor 112, which drives the engine 3 through the engine gearbox 20. When the engine 3 reaches a certain speed (self-accelerating speed), the turbine 117 is disconnected from the compressor 112 through the clutch 114.

It is possible to drive the compressor 112 by a motor through a belt or any other device. The compressor 112 will drive the engine 3 through the engine gearbox 20. When the engine 3 reaches a certain speed (self-accelerating speed), the motor is disconnected.

There is no need for start cool down periods when using these 2 methods.

5.3 The Use of the Compressor 112 and the Turbine 117 During Taxiing and Take-Off:

Many airlines are not operating all the engines of an aircraft (for example only one operating engine in twinjet) during taxiing (especially in taxi-in, but it is also used during long taxi-out in congested airport) to save fuel. In icing conditions, it is possible to use pneumatic power through the compressors 86 and 96, the pneumatic power provided by the operating APU 4 (through its load compressor), or the pneumatic power from the operating engine to anti-ice the shutdown engine during single engine or reduced engines taxiing (the current engines are not anti-iced when they are shutdown). The compressor 112 can also provide the pneumatic power to anti-ice and de-ice the shutdown engine 3 especially during long taxi-out by following this method:

The compressor 112 is normally connected to the engine gearbox 20 through the clutch 111 and the turbine 117 is connected to the compressor 112 through the clutch 114. The compressor 112 is driven by the turbine 117 after being supplied by any appropriate combination of air sources (operating APU 4, compressor 86 and/or 96, operating engine, or engine bypass air since the shutdown engine will be motored) through the valve 119. By using the EDP 40, the IDG 30, the compressor 112, and their respective accessories the shutdown engine 3 can be motored to a greater N2 speed (without cool down periods) to shed ice from the fan 5 and the spinner and prevent ice accumulation (from certain speed of N2 spool, the N1 spool will start turning). Since the compressor 112 is driven, therefore it will compress any appropriate combination air sources (ambient air, turbine air discharge, and engine bypass air) through the air valve 118 and provide the compressed air to anti-ice and de-ice the shutdown engine 3. During single engine or reduced engines taxiing, the engine run-up procedure for the operative engine(s) cannot be performed for operational reasons especially in congested airport in the taxiway (in the current engines and in case of in icing conditions, the engine is revved up to 70% N1 each 30 minutes and during 30 seconds in taxiing). The suggested method to anti-ice the shutdown engine can be considered as complementary procedure (applied after each certain short period of time, for example each 7 to 10 minutes) to the regular engine run-up procedure and it is possible to use this new procedure during a taxiing of less than 30 minutes as a precaution. The regular run-up procedure up to 70% N1 or more can be performed in static just prior the release of the brakes on take-off. The pneumatic power provided by the compressor 112, the compressors 86 and 96, the pneumatic power provided by the operating APU 4 (through its load compressor), or the pneumatic power from the operating engine can be used during take-off bleed off especially in short/high (altitude)/hot (weather) runway or to increase aircraft payload. If the standby pneumatic power is not used during the anti-ice and de-ice of the shutdown engine to prevent damage, this power can replace the engine bleed air power (engine bleed air shut off) during taxiing especially with single engine (for a twin) or reduced engines taxiing-out (for trijet or quadjet) in congested airport and reduce fuel consumption because engines are off-loaded since engine bleed air is turned off. As a substitute to the present engine bleed air system in the current engines, the pneumatic power can provided through two compressors 112 (in each engine 3), compressors 86 and 96, and the APU 4 through its load compressor (the APU 4 will be operated during all the flight and it can be dispatched inoperative since it is possible to use the starter-generator 80, the hydraulic pump 90 and the compressors 86 and 96 in the standby mode).

5.4 Engine Fire:

In case of engine fire, the engine 3 is shutdown and the fire extinguisher is activated and the aircraft will divert. For the diversion the aircraft will drift-down to an altitude where the airplane may encounter icing conditions (especially for a twinjet) and more bleed air will be needed the air conditioning system and to anti-ice the aircraft and the operating engine(s) since the failed engine cannot provide engine bleed air. In addition more thrust will be needed to fly at higher altitude (to reduce the drag). In such case the operating engine(s) (especially in twinjet) is operating at high power (the thrust is set at MCT: maximum continuous thrust) and may cause engine bleed trip-off or even engine failure (cascade failures). At single engine operating altitude, the APU may be operating at altitude where the pneumatic power cannot be provided, since the electric power provided by the APU have the priority in the current APUs. According to this invention it is possible to provide standby pneumatic power to off-load the operating engine(s) and allow the aircraft to fly higher than before (less fuel consumption). This standby pneumatic power can also be used to de-ice and anti-ice the shutdown engine to prevent damage (if it is not damaged) or further damage (if it is already damaged), after a period of cool down for the engine 3 (in order to dissipate heat and avoid a recurrence of fire) by using the following method:

Disconnect the compressor 112 from the engine gearbox 20 using the clutch 111. Use the clutch 114 to connect the compressor 112 to the turbine 117. The engine fire warning switch is then stowed to its normal position (IN position). The air turbine 117 will be provided with engine bypass air and/or ram air through air valve 119. The turbine 117 will now power the compressor 112, which will be supplied by any appropriate combination of air sources (engine bypass air, ram air, turbine discharge air) through the air valve 118. It is also possible to use the turbines (37 & 47) discharge air to provide the compressor 112 since the IDG 30 and the EDP 40 are operating in the standby mode if needed after engine fire. The compressor 112 will compress this air and provide this standby pneumatic power to the aircraft systems especially for an extended diversion (180 or 207 minutes ETOPS flight) and to enhance safety (redundancy) during the diversion (a current APU is not able to provide pneumatic power at such altitude after drift-down especially if electric power is delivered or the APU failed to start successfully). According to this invention the APU 4 can provide standby pneumatic power through the compressor 86 and the 96 even if the APU 4 fails to start or it is not operating.

5.5 In Flight Engine Shutdown:

The compressor 112 can provide a standby pneumatic power in case of engine shutdown by following the same method as in engine fire (paragraph 5.4). In such case the failed engine 3 can still provide standby electric and hydraulic power (through the IDG 30 and the EDP 40). The APU 4 can provide standby pneumatic (through the compressor 86 and 96) in addition to the electric and hydraulic power (whether in normal or standby mode). This will off-load the operating engine(s) (especially on a twinjet), therefore it will provide more thrust. This extra power will increase the single (operating) engine aircraft altitude and reduce the fuel consumption. This back-up power will reduce the fuel consumption, so a trijet or quadjet can reach the intended destination safely since they are allowed to continue the flight after single engine shutdown (precautionary shutdown). The standby pneumatic power may be used to anti-ice and de-ice the shutdown to prevent damage (if it is not damaged) or further damage (if it is already damaged).

5.6 The Use of the Compressor 112 as Starter in Flight:

The compressor 112 (through the turbine 117) can be used as a starter to start the engine 3 in flight if the engine 3 is out of windmill start limits (in case of engine flame-out) and the restart attempt is not successful by following this method:

The crew connects the turbine 117 to the compressor 112 using the clutch 114, so that the engine gearbox 20, the compressor 112, and the turbine 117 are all connected together. The air valve 119 supplies air (any appropriate combination of air sources: engine bypass air, ram air, operating engine, APU, compressor 86 and/or 96) to the turbine 117, which drives the engine 3 through the compressor 112 and engine gearbox 20. After the engine 3 reaches a self-accelerating speed, the turbine 117 is disconnected from the compressor 112. For a quick engine recovery or during a critical phase of flight after engine flame-out, the engine 3 needs more torque. In such case it is preferable to use more air sources assisted by the use of the IDG 30 or the EDP 40 as back-up starter at the same time and in the same way as the compressor 112. When the engine 3 becomes autonomous, the turbines (117, 37 or 47), are disconnected.

5.7 The Use of the Compressor 112 in Flight:

The compressor 112 can provide pneumatic power either it is driven by the operating engine 3 (if connected to engine gearbox 20 through the clutch 111) or driven by the turbine 117 if the compressor 112 is disconnected from the engine gearbox 20 using clutch 111 and connected to the turbine 117 (in standby mode) through the clutch 114. The turbine 117 is supplied by engine bypass air and/or ram air through the air valve 119. The air valve 118 will provide any appropriate combination of air sources (engine bypass air, ram air, or turbine discharge air) to the compressor 112, which compresses this air and supplies it to the aircraft systems. The pneumatic power provided by the compressor 86 and 96 and the APU 4 (through its compressor load) with the injunction of the pneumatic power provided by the compressor 112 can replace the pneumatic power provided by the current engine (the regular engine bleed air in the current engines is too hot and high pressure that a great part of its energy is wasted in the precooler). This pneumatic power provided can also be used to relieve load on engine 3, therefore improve the climb performance (reduced climb time) and higher and more efficient cruise altitude, or in case of bleed trip-off. It is also possible to install another compressor 112 (two compressors 112 per engine) to the engine gearbox 20 to provide more air and for the redundancy. Such power can offer better stability and greater surge margin for engine (especially for engine HP compressor 11 and preferably with compressor 112 driven by the turbine 117 and not by the engine gearbox 20) and reduce fuel consumption: for example for a descent the flight idle will be set to a low power setting, since the fast (and required also) engine acceleration can be ensured within 6 seconds by the greater surge margin (usually in the current engines: the flight idle is set to a high power thrust setting to achieve the required 95% of go-around within 6 seconds).

6) Applications of the New Accessories in the APU.

The APU 4 may be fitted with a compressor and turbine (similar to the compressor 112 and turbine 117 in the engine 3) as an option if the APU 4 is not fitted with compressors 86 and 96.

In the present APUs, it is possible (but not convenient) to drive the APU's main shaft for a ground test and troubleshooting through a cranking pad (in some APUs, a plug is located in the air-oil separator housing and it is normally used for borescope inspection). Then the maintenance crew can connect any kind of motor to drive the APU main shaft. This method is not very beneficial (not mentioned in the maintenance manual) because it will crank the entire APU 4 and requires a powerful motor to drive the entire APU 4 to high speed with all the components attached. Nevertheless, it allows the maintenance crew to test the APU systems with the APU off. The advantages are less noise (no combustion), and no gas exhaust (so the APU can be tested inside a hangar).

According to this invention, an improved method is hereby disclosed which consists of testing the APU components by running only the concerned component on the ground by disconnecting it from the APU gearbox 110 and driving it either with a turbine or a cranking pad (in the latter case, using a motor). It is also possible to use certain gearbox components in some emergency situations or abnormal conditions by disconnecting these components from the APU gearbox 110 and connecting them to their turbines, which drive the gearbox components to provide standby power.

6.1 APU Oil Pump and FCU:

It is assumed here that the APU oil pump 60 will include a supply pressure pump and a scavenge pump (driven by the same shaft). To test the APU oil and fuel system, a clutch 101 is installed in the APU oil pump 100. The clutch 101 will normally be connected to the APU gearbox 110. The APU FCU (fuel control unit) 105 will be fitted with a cranking pad 103. The clutch 101 can be controlled manually or electrically from the cockpit, but because it will be used mostly on the ground, it is preferable for it to be manual. The cranking pad 103 may be assembled with the FCU 105 or the APU oil pump 100; The cranking pad 103 is best installed in the FCU 105 for access reasons because in recent APU's the FCU 105 is installed on the APU oil pump 100 and is driven by the same shaft as illustrated in FIG. 5.

(a) APU Oil and Fuel System Ground Test:

Because the APU 4 is more automated and has fewer components than the engine 3, the discussion of the APU components test will be fairly brief and mainly covers the tests related to the removal and installation of filters (oil, fuel), leakage tests, and so forth. In the recent APUs, the APU oil pump 100 and the fuel control unit (FCU) 105 are driven by the same shaft. The APU switch is moved to the ON position to open the APU fuel shutoff valve, then the fuel boost pump switch is moved to the ON position to supply fuel to the FCU 105. The fuel solenoid valve (in the FCU) will be closed, so the fuel does not flow beyond the FCU 105 (it is possible to remove the electric plug from the fuel solenoid valve to be certain that the fuel does not pass beyond the FCU 105). Using the manually controlled clutch 101, the oil pump 100 is disconnected from the gearbox 110 (the FCU 105 is also disconnected via the oil pump 100), then the cranking pad 103 is connected to any type of motor. The motor will turn the FCU 105 and the oil pump 100 without turning the gearbox 110. The maintenance crew can now test the APU's oil and fuel components and system (including the part of the fuel system upstream from the FCU 105) without running the entire APU 4. It is possible to install a fuel hose(s) (for ground test use only), which connects the upstream of the APU fuel nozzles and the APU fuel supply (similar fuel hose was added to the engine fuel system for ground test only) in order to test other APU fuel components (downstream the FCU. 105) like fuel flow divider and fuel flow solenoid.

The turbine 37 or 47 (used as a shared turbine between two components) can drive the oil pump 50 if the turbine is connected to the oil pump 50 through a belt and a clutch). This turbine may be used in flight to warm up APU oil before APU start after being cold-soaked during long flight at altitude cruise, in order to facilitate the APU start at high altitude (in such case the clutch 101 will controlled electrically from the cockpit). In addition to ground start, this turbine can be used as starter (by driving the HMU 55 and the oil pump 50)

6.2 APU Starter-Generator:

It is assumed here and as illustrated in FIG. 5 that the APU 4 is fitted with starter-generator 80, it is functional; and is fitted with clutches 81 and 85 (both controlled from the cockpit), cranking pad 83, turbine 87, and air valve 89; and that a clutch 84 can connect or disconnect a compressor 86 (to the turbine 87) that is supplied by air through an air valve 88. It is also assumed that the APU starter-generator 80 is cooled by air or fitted with its own cooling and/or lubrication system to insure that cooling and lubrication are provided when the APU starter-generator 80 is disconnected from the APU gearbox 110 and driven by the turbine 87 especially in flight. Since the APU operates at fixed RPMs the APU starter-generator 80 may be fitted with a speed regulator (used only in standby mode when the starter-generator 80 is driven by the turbine 87,) and this speed regulator (or CSD: constant speed drive) may be built-in the starter-generator 80 as in any IDG.

(a) Ground Test and Use of the APU Starter-Generator:

The APU starter-generator 80 is disconnected from the APU gearbox 110 using the clutch 81 and connected to the turbine 87 using the clutch 85. Then an air compressor outlet is connected to the test port of the turbine 87; it will drive the starter-generator 80 only. The maintenance crew can now test and troubleshoot the starter-generator 80 without running the entire APU 4.

The maintenance crew can also drive the APU starter-generator 80 by disconnecting the APU starter-generator 80 from the gearbox 110 using a clutch 81 (the turbine 87 is also normally disconnected from the APU starter-generator 80) and then driving the cranking pad 83 with a motor. The maintenance crew can now test and troubleshoot the starter-generator 80 without running the entire APU 4. Another application that ensue from this invention is described in the following paragraph:

During aircraft turn-around time at airport gate or aircraft maintenance inside the hangar it is possible to produce electric power by driving the APU starter-generator 80 either with a motor or air compressor outlet (preferably with an air compressor outlet because the turbine discharge air may be used)

and following the same 2 methods performed for ground test of the starter-generator 80 mentioned above. This procedure will provide electricity for aircraft ground use instead of the use of the APU 4 or the GPU (ground power unit).

This method will reduce the fuel consumption, noise, and emissions gas. During starter-generator ground test or use (to produce electricity), the APU starter-generator 80 is cooled by installing temporarily a fan on the back of the starter-generator oil cooler (the same cooling procedure performed for IDG mentioned in the paragraph 1.1).

While producing electric power during aircraft turn-around time it is possible to provide air to aircraft air conditioning system during passengers boarding, if the APU starter-generator 80, the turbine 87, and the compressor 86 are all connected together (the compressor 86 is connected to the turbine 87 through a clutch 84). Using an air compressor outlet the air turbine 87 drives the air compressor 86. After receiving the ambient air and the turbine discharge air through the air valve 88 the compressor 86 will compress this air and provide it for the aircraft air conditioning system. It is also possible to provide more air to the aircraft air conditioning system during the boarding at the gate or for the ground test and the troubleshooting of the air conditioning system (for later case inside the hangar and the APU 4 is shut down). This can be achieved by disconnecting the turbine 97 from the APU hydraulic pump 90 (the hydraulic pump 90 is not used, unless there is a need for it) and connecting it to a compressor 96 through a clutch 94. An air compressor outlet will provide air to the turbine 97, which drives the compressor 96 that compresses the turbine discharge air and the ambient air. Both air sources are provided through the air valve 98. Now more compressed air from the compressor 86 and 96 is provided to the aircraft air conditioning system (for ground test/troubleshooting and ground use at the gate).

(b) The Use of the APU Starter-Generator 80 as a Back-Up Starter on the Ground:

Normally the APU starter-generator 80 is driven by electricity when it is used as starter. If the APU electrical starting system is not operating the APU starter-generator 80 can be used as a back-up starter (mechanically) for starting and motoring the APU 4 by driving the turbine 87 or the cranking pad 83 assuming the APU starter-generator 80 is turning freely (not seized). To ensure that the APU starter-generator 80 will provide the necessary torque (as starter) to the APU gearbox 110 during starting or motoring only, APU generator (GEN) switches are turned off. APU starter-generator 80 can be used as a back-up starter by the following two methods:

The APU starter-generator 80 is connected to the APU gearbox 110 using the clutch 81. By using the clutch 85, the APU starter-generator 80 is connected to the turbine 87, which is driven by air through an air compressor outlet. The turbine 87 turns the APU starter-generator 80, which drives the APU 4 through the APU gearbox 110. When the APU 4 reaches a certain speed (self-accelerating speed), the turbine 87 is disconnected from the APU starter-generator 80. Using the starter-generator 80 and the APU hydraulic pump 90 (similar method as the starter-generator 80) as starters simultaneously will improve the APU start at high altitude airport and during hot weather.

The APU starter-generator 80 can also be driven by connecting a motor to the cranking pad 83. The APU starter-generator 80 will drive the APU 4 through the APU gearbox 110. When the APU 4 reaches a certain speed (self-accelerating speed), the motor is disconnected from the APU starter-generator 80. The maintenance crew can also use APU starter-generator 80 alternately as a starter with other APU gearbox components (APU hydraulic pump 90 and APU oil pump/FCU) without cool down periods.

(c) APU Fire:

It is supposed here that the APU 4 was turned on because there was a need for electrical power due to engine shutdown, IDG 30 failure in flight, or one of the engine IDG is dispatched inoperative, and after that APU fire occurred. In this case and according to this invention the APU 4 is shut down (whether automatically or manually by pilot) and the fire extinguisher is activated. Allowing a period of time for the APU to cool down in order to dissipate heat and avoid a recurrence of fire), it is still possible to use the APU starter-generator 80 as long as this component was operating before the APU fire. It is important to make sure that the APU starter-generator 80 was operating properly before the APU fire and prior placing the starter-generator 80 back online to eliminate the possibility of a leak in the APU starter-generator oil system or anomaly in the starter-generator 80, which could cause another APU fire or further damage to the starter-generator. By using the following method, the APU starter-generator 80 is brought back online:

Disconnect the APU starter-generator 80 from the APU gearbox 110 using the clutch 81. Use the clutch 85 to connect the APU starter-generator 80 to the air turbine 87. The APU fire warning switch is then returned to its normal position (IN position and the APU 4 is still shutdown). The air turbine 87 will be provided with air (any appropriate combination of air sources: ram air, operating engine, compressor 86 and/or 96, or compressor 112) air through air valve 89. The air turbine 87 will now power the APU starter-generator 80, which will produce standby electric power for the rest of the flight even though the APU 4 is shut off. This will be an advantage for the diversion because, now that the pilots have a source of standby electrical power, the airplane will continue safer flight and landing to the diversion airport. This procedure may allow reaching the original destination airport (if it is close to diversion airport, both engines are still operating, and only one of the engine IDG is inoperative), and can extend the ETOPS diversion time because the pilots can choose other diversion airports if the nearest airport is unavailable or not suitable.

(d) In Flight APU Shutdown:

It is supposed here that the APU 4 was turned on because there was a need of electrical power due to engine shutdown, IDG 30 failure, etc. According to this invention—the pilots can use the APU starter-generator 80 to provide standby electric power in certain abnormal flight situations, such as an APU automatic (protective) shutdown by the following method:

Disconnect the APU starter-generator 80 from the gearbox 110 using the clutch 81. Then connect the turbine 87 to the APU starter-generator 80 using the clutch 85. The air valve 89 will supply air (any appropriate combination of air sources: ram air, operating engine, compressor 86 and/or 96)) to the turbine 87. The turbine 87 will drive the APU starter-generator 80, which will produce standby electricity. This power may be lower than what a normally operating APU would provide, and it will be used mainly for certain important aircraft systems in conjunction with the standby power of IDG 30 in the event of an in-flight engine 3 shutdown. This standby power can be used even in case of the failure of the IDG 30 and the failure of the APU 4.

(e) The Use of Starter-Generator 80 in Case of its Failure

If the APU generator 80 fails in flight, the pilots can disconnect it from the APU gearbox 110 using the clutch 81 and connect it to the air turbine 87 using the clutch 85. The turbine 87 will be provided with any appropriate combination of air sources: ram air, operating engine, compressor 86 and/or 96, or compressor 112 through the air valve 89. If the APU generator 80 is operating, it indicates that the failure of the APU generator 80 is external. Disconnecting the APU generator 80 will reduce fuel consumption because the APU gearbox 110 is relieved of the load created by the APU generator 80. If the APU generator 80 is not operating, it indicates that the failure is internal, so its disconnection from the APU gearbox 110 will avoid further damage to the APU generator 80 and relieve load on the APU 4.

(f) The Use of Starter-Generator 80 as Back-Up Starter in Flight:

Normally the APU starter-generator 80 is electrically driven when it is used as starter. If the APU electric starting system is not operating and the starter-generator 80 can turn freely if it is driven the pilots can still use the APU generator 80 as a back-up starter to start the APU 4 by following this method:

The crew connects the turbine 87 to the APU generator 80 using the clutch 85, so that the APU gearbox 110, the APU generator 80, and the turbine 87 are all connected together. The air valve 89 supplies air (any appropriate combination of air sources: ram air, operating engine, compressor 96, or compressor 112) to the turbine 87, which drives the APU 4 through the APU generator 80 and APU gearbox 110. In order to ensure that the APU starter-generator 80 will provide the necessary torque (as starter) to the APU gearbox 110, the APU generator (GEN) switches are turned off (during APU start only). At high altitudes the APU start is not always successful especially after long flight (the APU will be "cold soaked"). In such case and in order to improve APU start and provide the adequate torque and acceleration, the crew can also use the APU hydraulic pump 90 as back-up starter at the same time and in the same way as the APU starter-generator 80. When the APU 4 becomes autonomous, the flight crew disconnects the turbines (87, 97). Before APU start it is possible to motor the APU 4 (using the starter-generator 80 and the hydraulic pump 90) if it is cold soaked after long flight in order to warm up the oil and facilitate the APU start.

In case of the failure of the IDG 30 in flight, providing APU high altitude start capability will prevent having flight level change so the pilots will not cross through the established track systems for lower altitude just to start the APU. When the flight leaves the established track system it may be difficult or impossible to re-enter the track system. This will reduce and affect the pilot's flexibility to fly the optimum flight plan. Even if the APU start is successful at high altitude, the APU output will be limited. Therefore, the pilots can disconnect APU hydraulic pump 90 if they need more electric power: the APU starter-generator 80 will provide electric power while it is connected and driven by the APU gearbox 110, and the APU hydraulic pump 90 will provide standby hydraulic power while it is disconnected from the APU gearbox 110 and driven by the turbine 97, and vice versa if they need more hydraulic power than electric. The compressors 86 and 96 can provide a standby pneumatic power through the use of the turbine 87 and 97.

6.3 APU Hydraulic Pump:

Here it is supposed that The APU 4 is fitted with an APU hydraulic pump 90 as illustrated in FIG. 5 to provide hydraulic power. For present purposes, it is assumed that the APU hydraulic pump 90 is functional and it is fitted with 2 clutches (91, 95) controlled from the cockpit, a cranking pad 93, a turbine 97, and an air valve 99. The APU hydraulic pump 90 may provide standby hydraulic power (in case of pump failure, hydraulic system loss, or all engines flame-out) through interconnect valves and separate hoses to the main flight controls in flight; to the brakes, speed brakes, and thrust reversers on the ground. During single engine (for a twins) or reduced engines (for a trijets or quadjets) taxiing, the APU hydraulic pump 90 (through its valves) can provide the appropriate hydraulic power to the brakes (regardless of the position of the operating engine(s)) and allow pilots to perform functional check of flight controls (main and secondary flight controls) during taxiing or in the gate. Usually in the current aircraft, this is not always possible depend on the position of the operating engine that will provide hydraulic power through the EDP 40 to the brakes.

(a) Ground Test and Use of the APU Hydraulic Pump:

According to this invention the maintenance crew can test the APU hydraulic pump 90 without running the APU 4. By using the clutch 91, the crew disconnects the APU hydraulic pump 90 from the gearbox 110. Then they can use the clutch 95 to connect the APU hydraulic pump 90 to the turbine 97, which will be connected to an air compressor outlet to drive the APU hydraulic pump 90 only. The ground crew can now troubleshoot and test the APU hydraulic pump 90 and its related system without running the entire APU 4.

A maintenance crew can also test and troubleshoot the APU hydraulic pump 90 without turning the entire APU 4 by driving the APU hydraulic pump 90 with a motor through the cranking pad 93, after disconnecting the APU hydraulic pump 90 from the gearbox 110 using the clutch 91.

According to this invention, driving the APU hydraulic pump 90 by a motor or an air compressor outlet through its turbine 97 after disconnecting the hydraulic pump 90 from the APU gearbox 110 will provide hydraulic power for the ground test and troubleshooting for the APU hydraulic pump 90 and its related aircraft hydraulic system inside the hangar (even if the aircraft is lifted on jacks) and at airport gate instead of the use of the of the APU 4 or the ground hydraulic cart. The hydraulic power provided by the APU hydraulic pump 90 can also be used by other hydraulic systems if the hydraulic pump 90 system is interconnected to other systems through interconnect valves.

(b) Use of the APU Hydraulic Pump 90 as a Back-Up Starter on the Ground:

To ensure that the APU hydraulic pump 90 will provide the necessary torque (as standby starter) to the APU gearbox 110 during starting or motoring only, the hydraulic pump 90 switch is turned off. If the APU start system is not functioning, the maintenance or the flight crew can use the APU hydraulic pump 90 as a back-up starter by the following method:

The APU hydraulic pump 90 is normally connected to the APU gearbox 110 using the clutch 91. By using the clutch 95, the crew connects the APU hydraulic pump 90 to the turbine 97, which is driven by air through air compressor outlet. The turbine 97 turns the APU hydraulic pump 90, which drives the APU 4 through the APU gearbox 110. At a certain speed (self-accelerating speed), the crew disconnects the turbine 97 from the APU hydraulic pump 90. Using the APU hydraulic pump 90 and the starter-generator 80 (similar method as the hydraulic pump 90) as starters simultaneously will improve the APU start at high altitude airport and during hot weather.

It is possible to use the APU hydraulic pump 90 as standby starter 90 by driving the cranking pad 93 by a motor. The APU hydraulic pump 90 will drive the APU 4 through the APU gearbox 110. At a certain speed (self-accelerating speed), the turbine 97 is disconnected from the APU hydraulic pump 90.

It is possible to use the APU hydraulic pump 90 alternately as a standby starter with other unit(s): the APU oil pump 100/FCU 105 or the APU starter-generator 80. This load-sharing can reduce or eliminate the APU starter operation limitation (i.e., the APU 4 can be cranked without the need for cool down periods).

(c) APU fire: It is supposed here that the APU 4 is turned on because there is a need for hydraulic pressure due to engine shutdown or EDP 40 failure, and after that APU fire occurred. In this case and according to this invention, after an automatic shutdown or shutting down the APU, activating the fire extinguisher and allowing a period of time for the APU cool down in order to dissipate heat and avoid a recurrence of fire, it is still possible to use the APU hydraulic pump 90 if this component was normally operating before the APU fire. Before bringing back online the APU hydraulic pump 90, it is important to make sure that the pump 90 was working properly before the APU fire to avoid the possibility that a hydraulic leakage in the APU hydraulic pump or its system will cause another APU fire or damage to the hydraulic pump 90 (due to the lack cooling and lubrication while driving the hydraulic pump 90). The pilots can disconnect the APU hydraulic pump 90 from the APU gearbox 110 using the clutch 91, then drive the pump with air turbine 97 after connecting those two components using the clutch 95. After the APU fire warning switch is turned to its normal position (IN position but with APU 4 still shutdown), the APU hydraulic pump 90 will produce standby hydraulic power for the rest of the flight or for the diversion). This will allow continuing for a safe flight and landing especially for long diversion. For other flights with short or medium diversion time this procedure may allow the airplane to reach the destination airport if the latter is not far from the diversion airport. This procedure will ameliorate the ETOPS flights or routes because the pilots can choose another diversion airport if the nearest airport is not available or not suitable.

(d) In Flight APU Shutdown:

It is supposed here that the APU 4 was turned on because there was a need of hydraulic power due to engine shutdown, EDP 40 failure, hydraulic leakage, etc. According to this invention, the pilots can use the APU hydraulic pump 90 as a back-up device in certain flight emergency cases or abnormal flight conditions, and even after a failure of the APU such as an APU automatic (protective) shutdown, by the following method:

Disconnect the APU hydraulic pump 90 from the gearbox 110 using the clutch 91. Then connect the turbine 97 to the APU hydraulic pump 90 using the clutch 95. The air valve 99 will supply air (any appropriate combination of air sources: ram air, operating engine, compressor 86, or compressor 112) to the turbine 97. The turbine 97 will drive the APU hydraulic pump 90, which will produce standby hydraulic power. Even if this power is reduced from the normal level of output, it will nonetheless be useful for certain important flight systems in conjunction with the standby power of the EDP 40 (in case of in-flight engine shutdown or engine flame-out). The APU hydraulic pump 90 can also be used as a back-up to the EDP 40 if the EDP fails, to assist the electrical driven pump 38 of the same hydraulic system, since this driven pump 38 has a low hydraulic flow rate. The APU hydraulic pump 90 can also be used as back-up to the EDP 40 and/or the electrical driven pump 38 if it is used to provide a power transfer unit (PTU). The APU hydraulic pump 90 can supply hydraulic power to other hydraulic systems through interconnect valves.

(e) The Use the Hydraulic Pump 90 in Case of its Failure:

If the APU hydraulic pump 90 fails in flight, it can be disconnected from the APU gearbox 110 using the clutch 91 and then connected to the air turbine 97 using the clutch 95. The air valve 99 will provide air (any appropriate combination of air sources: ram air, operating engine, compressor 86, or compressor 112) to the air turbine 97. If the APU hydraulic pump 90 is operating, this is an indication that the failure of the APU hydraulic pump 90 is external. Disconnecting APU hydraulic pump 90 will relieve load on APU 4.

If the APU hydraulic pump 90 is not operating, it indicates that the failure is internal; therefore, its disengagement from the APU gearbox 110 will prevent further damage to the APU hydraulic pump 90. Disconnecting the APU hydraulic pump 90 will reduce fuel consumption because the APU gearbox 110 is relieved from the load of the APU hydraulic pump 90 since the APU 4 is still operating.

(f) Hydraulic Loss:

If the APU 4 is operating and in case of an in-flight hydraulic fluid loss in the APU hydraulic system, the pilots can disconnect the APU hydraulic pump 90 from the APU gearbox 90 to prevent the pump 90 from turning without lubrication, thereby saving it from damage. (g) The use of the APU hydraulic pump as starter in flight:

It is possible to use the APU hydraulic pump 90 as a back-up starter to start the APU 4 by following this method:

The crew connects the turbine 97 to the APU hydraulic pump 90 using the clutch 95, so that the APU gearbox 110, the APU hydraulic pump 90, and the turbine 97 are all connected together. The air valve 99 supplies air (any appropriate combination of air sources: ram air, operating engine, compressor 86, or compressor 112) to the turbine 97, which drives the APU 4 through the APU hydraulic pump 90 and APU gearbox 110. In order to ensure that the APU hydraulic pump 90 will provide the necessary torque (as standby starter) to the APU gearbox 110, the switch of the APU hydraulic pump 90 is turned off (during APU start only).

In-flight APU start is not always successful, particularly at high altitudes. Usually the APU requires more torque than is conventionally available to successfully start, especially if the APU was "cold soaked" after long flight. The APU generator 80 can be used as back-up starter (in the same way as the APU hydraulic pump 90) simultaneously with the APU hydraulic pump 90. When the APU 4 becomes autonomous, the turbines (97, 87) are disconnected.

Before APU start it is possible to motor the APU 4 (using the starter-generator 80 and the hydraulic pump 90) if it is cold soaked after long flight in order to warm up the oil and facilitate the APU start.

Even if the APU start is successful at high altitudes, the APU output will be limited. Therefore, the pilots can disconnect the APU generator 80 if they need more hydraulic power: the APU hydraulic pump 90 will provide hydraulic power while it is connected and driven by the APU gearbox 110, and the APU generator 80 will provide standby electric power while it is disconnected from the APU gearbox 110 and driven by the turbine 87. The gearbox 110 will be relieved from the load of the APU generator 80, so that the APU 4 will provide more power to the hydraulic pump 90. The compressors 86 and 96 can provide standby pneumatic power through the turbine 87 and 97 even at high altitude at the opposite of the current APUs that can provide only pneumatic power up to 17,000 or 22,000 ft (depend on aircraft)

6.4 The Use of the Compressor 86 and/or 96:

As the same way as the APU starter-generator 80 and hydraulic pump 90, the compressors 86 and 96 can be installed on IDG 30 and EDP 40 respectively on engine 3 (or one compressor shared between the IDG turbine 37 and the EDP turbine 47). Here it is assumed that these compressors 86 and 96 are installed on the APU 4 only as illustrated in FIG. 5. Whether the APU 4 is operating or not (failed in flight or dispatched inoperative) and even after engine shutdown, the pneumatic power can be provided by the compressor(s) 86 and/or 96 by the following methods 1 anti-ice system, esed air after being provided by ram air and turbine discharge air. There are 3 cases:

(a) The Compressor(s) 86 and/or 96 is Driven by the APU 4:

In this case it is assumed that the APU 4 is operating and the APU gearbox 110, the APU starter-generator 80, the turbine 87, and the compressor 86 are connected together: the clutch 81 connects the APU gearbox 110 with the starter-generator 80, which is connected to the turbine 87 through the clutch 85, and the compressor 86 is connected to the turbine 87 through the clutch 84. When the APU 4 is operating the compressor 86 is turning and compressing the ram air that is provided through the air valve 88. The compressed air will be used by the aircraft systems. It is also assumed here that the APU gearbox 110, the APU hydraulic pump 90, the turbine 97, and the compressor 96 are connected together: the clutch 91 connects the APU gearbox 110 with the APU hydraulic pump 90, which is connected to the turbine 97 through the clutch 95, and the compressor 96 is connected to the turbine 97 through the clutch 94. Since the APU 4 is operating, the compressor compresses the ram air that is provided through the air valve 98. The compressed air from the compressors 86 and 96 is provided to aircraft systems like air conditioning and anti-ice. Besides providing electric and hydraulic power since the APU 4 is operating, it is possible to use pneumatic power through the compressors 86 and 96 in addition the to pneumatic power provided by the operating APU 4 (through its load compressor). This pneumatic power can replace the engine bleed air power during taxiing especially with single engine (for a twin) or reduced engines taxiing-out (for trijet or quadjet) in congested airport and reduce fuel consumption because engines are off-loaded since engine bleed air is turned off. This pneumatic power can be used also for take-off bleed off (engines air bleed off) especially in short/high/hot runway, or to increase aircraft payload, and even during climb in order to improve aircraft performance. According to this invention it is the most desirable to use the APU 4 (with all the added accessories and the use of new methods related to the APU gearbox components) in most phases of the flight if not all, at the opposite of the current aircraft where the APU is not usually used (except for some take-offs bleed off, certain dispatch cases, or during emergency/abnormal flight condition). Even on ground and especially recently (high fuel price) the APU is not often used because of the use of the ground restrictions and environmental reasons are observed mainly in certain airports. In addition during aircraft turn-around time the APU is not used often as the GPU (if it is available at the gate), because the GPU is cost effective.

(b) The Compressor 86 and/or 96 is Driven by the Turbine 87 and/or 97:

If the APU starter-generator 80 and/or the APU hydraulic pump 90 are inoperative and there is a need for pneumatic power (whether the APU 4 is operating or not), it is still possible to provide the pneumatic power by the compressors 86 and 96. It is assumed here that the turbine 87 is disconnected from the APU starter-generator 80 using the clutch 81 and the clutch 84 connects the compressor 86 to the turbine 87, which is supplied by ram air through air valve 89. The turbine 87 drives the compressor 86, which is supplied by ram air and turbine discharge air through the air valves 88. This air is compressed in the compressor 86 and supplied to aircraft systems. It is also supposed here that the turbine 97 is disconnected from the APU hydraulic pump 90 using the clutch 91 and the clutch 94 connects the compressor 96 to the turbine 97, which is supplied by ram air through air valve 99. The turbine 97 drives the compressor 96, which is supplied by ram air and turbine discharge air through the air valves 98. This air is compressed in the compressor 96 and supplied to aircraft systems. The standby pneumatic power can be provided if needed from the compressors 86 and 96, without depending on the APU output even at high altitude, at the opposite of the current APU's: for example certain APUs provide only pneumatic power up to 17,000 ft or 22,000 ft, pneumatic and electric power up to 10,000 ft, and reduced electric power up to the cruise altitude. The standby pneumatic power can be used for the aircraft air conditioning system (at least it will supply one pack system) or anti-ice system after engine shutdown or engine flame-out: in such case the aircraft will fly at lower altitudes (after drift-down) where the airplane may encounter icing conditions. This compressed air will be used for wings anti-ice, and may be even to anti-ice the failed engine in order to prevent engine core damage or reduce further damage (if it was already damaged after birds strike, high vibration, etc.), although it can use the compressed air provide by the compressor 112. Usually the current engines are not anti-iced when they are shut down.

(c) The Compressor 86 and/or 96, the Starter-Generator 80, and the Hydraulic Pump 90 are Driven by the Turbine 87 and/or 97:

The APU starter-generator 80 and hydraulic pump 90 are disconnected from the APU gearbox 110. The clutch 85 and 95 connect the starter-generator 80 and hydraulic pump 90 to the turbine 87 and 97 respectively which are connected to the compressor 86 and 96 through the clutch 84 and 94 respectively. The turbine 87 and 97 are supplied by ram air and/or bleed air from operating engine (if available) through the air valve 89 and 99 respectively. The turbine 87 drives the starter-generator 80 and the compressor 86 while the turbine 97 drives the hydraulic pump 90 and the compressor 96. The compressor 86 and 96 will compress the ram and turbine discharge air and supply the compressed air to the aircraft systems.

In case of all engines and APU shutdown (fuel depletion, ash volcano encounter, or heavy hail), or after all engines failure (birds strike or high turbulence . . . ) and APU dispatched inoperative, the aircraft will lose pressurization and air conditioning system which leads to a non-ventilation of aircraft after emergency descent at safe altitude (14,000 or 10,000 ft) particularly if the aircraft diversion will last a long time (like ETOPS 180-207 minutes or long flight for quadjet). The problem could be worst if the pilots are flying over mountains where the aircraft altitude could be more than 14,000 ft with a limited oxygen quantity and without cabin ventilation, especially for certain aircraft that are not fitted with ram air scoop and during a long diversion time. In such case and according to this invention the standby pneumatic power provided by the compressors 86 and 96 can be used (after being cooled) to ventilate the aircraft. It is also possible to use this air to clear the smoke/fumes from the cabin and/or the cockpit, or even to use this air to ventilate the aircraft during unpressurized flight or in case of all bleed trip-off especially for aircraft, which are not fitted with ram air scoop. This air may be used to off-load the operating engine(s) (especially in the twins) because after engine shutdown the single operating engine may be over-loaded and may lead to what is known as "cascade failures" or bleed trip-off may occur.

After engine shutdown the failed engine 3 can still provide standby electric and hydraulic power (through the IDG 30 and the EDP 40) and even a standby pneumatic power through a compressor 112. The APU 4 can provide normal pneumatic power (through its load compressor up to a certain altitude) and standby pneumatic power (through the compressor 86 and 96) in addition to the electric and hydraulic power (whether in normal or standby mode). These redundancies will off-load the operating engine(s) (especially on a twinjet), therefore they will provide more thrust. This extra power will increase the single operating engine twinjet t altitude (or one inoperative engine aircraft altitude for trijets or quadjets) after drift-down and reduce the fuel consumption. The drag caused by the rudder trim (after engine shutdown) is also reduced with the increase of aircraft altitude and this will reduce more the fuel consumption.

Instead of shutting down an engine, sometimes it is possible to idle this engine (depend on the type of the anomaly especially in case of a precautionary shut down) if the engine parameters are in the permissible limit after the reduction of the power. In such case it is possible to use the IDG 30 and the EDP 40 in the standby mode in the idled engine 3 (IDG 30 and EDP 40 disconnected from the engine gearbox 20 and driven by the turbine 37 and 47 respectively or even disconnected and not used if there is enough electric and hydraulic through the operating engine and the APU). The engine bleed air is shut off. The compressor 112 can provide standby pneumatic power if it is driven by the turbine 117 (it is preferable in this case that the turbine will be not supplied by the engine bypass air). The APU 4 will provide electric and hydraulic power (in normal or standby mode) in addition to the pneumatic power (in normal and/or standby mode) according to the need and the availability of the APU 4. All these redundancies will off-load the idled engine 3 and increase its residual thrust. Therefore the airplane will fly at higher altitudes and reduce the fuel consumption. The increase of the residual thrust of the idled engine will reduce more the fuel consumption because the idled engine will decrease the trim between the normal operating engine and the idled engine (compared to the trim caused by single engine normally operating at MCT: maximum continuous thrust, in such case). In addition the airplane will fly at higher altitude with both engines compared to an altitude with single operating engine, so this will improve the fuel consumption during a diversion. For a quad the drag trim will be more reduced if the idled engine is the outboard one (compared to an outboard engine shutdown in the current engines).

In both cases (whether the engine is shutdown or idled) the goal of this procedure in a twinjet is not related to the reduction of the fuel consumption in itself during diversion, but to ensure a safe diversion and landing by saving more fuel for an eventual abnormal event like GA (go-around), the nearest airport or airfield is closed (bad weather), or loss of a hydraulic system . . . etc. In the later case when the gear is lowered manually (it cannot be retracted) or the leading edge devices are extended by standby pressure (for certain aircraft), the drag penalty may make it impossible to reach an alternate field. In a trijet or quadjet (especially quadjet) the goal of this procedure after drift-down is the reduction of the fuel consumption, so the aircraft can reach the intended destination safely since in a trijet or quadjet it is allowed to continue the flight after single engine shutdown (precautionary). During a ferry flight (with one engine shutdown) this procedure can enhance the safety: less drag penalty (because the failed engine may still provide electric, hydraulic, and pneumatic power in standby mode in conjunction with the use of the APU gearbox components either in normal or standby mode) and more redundancies in aircraft systems.

The applications of this invention are not limited to only the turbofan engine, they can be extended to other engines especially aircraft gas turbine engines. The accessories (clutches, cranking pad, turbines, compressors, valves) can be installed in any type of aircraft gas turbine engine (turbofan, turbojet . . . etc). Similar procedures regarding the use of these accessories on ground and in flight as in turbofan engine can be applied in any type of aircraft gas turbine engine. For light aircraft with internal combustion engine (turbocharged and supercharged according to the need), the turbine of the turbocharger can be provided and driven by the ram air and the exhaust gas to supercharge the engine or to provide compressed air for other use by driving the compressor (the turbine and the compressor are connected together). The compressor can also be used as supercharger if it is disconnected from the turbine through a clutch and connected to the engine through another clutch. In such case the compressor can provide compressed air for other use (other than engine) and the turbine (driven by ram air and exhaust gas) can drive another component like generator. It is possible to test generator and other engine components separately (without running the entire engine) if they are not installed inside engine provided these components are fitted with controlled clutches and disconnected from the engine. In emergency or abnormal flight situations, certain similar procedures as in turbofan can be applied on piston engine powered aircraft: for example in the event of the failure of the engine the turbine can drive the generator to provide standby electric power. Similar accessories installed in combustion engine aircraft can be provided to vehicle engines fitted with disengageable components: for example in a hybrid engine, during crusing the turbine will be supplied by ram air and exhaust gas. This turbine will drive a generator.

While embodiments of the invention have been illustrated and described, it is not intended that such disclosure illustrate and describe all possible forms of the invention. It is intended that the following claims cover all modifications and variations and alternatives designs, and all equivalents that fall within the spirit and the scope of this invention.

I claim:

1. An aircraft gas turbine engine, comprising a fan, a high pressure compressor, a combustor, a high pressure turbine connected to the high pressure compressor by a core shaft, a low pressure turbine connected to the fan by a fan shaft, and an engine gearbox fitted with:

an integrated drive generator (IDG) normally connected to the engine gearbox;
an engine driven pump (EDP) normally connected to the engine gearbox;
a fuel pump normally connected to the engine gearbox;
a hydro-mechanical unit (HMU) connected to the fuel pump; and
an oil pump normally connected to the engine gearbox, wherein the IDG includes:
an IDG clutch which can be controlled to connect the IDG with or disconnect the IDG from the engine gearbox, such that the IDG is normally connected with the engine gearbox and the IDG can be disconnected from the engine gearbox for ground test and troubleshooting of the IDG and as a means to prevent damage to the IDG and the aircraft gas turbine engine in certain flight emergency cases;

an IDG cranking pad which allows a motor to drive said IDG when said IDG is disconnected from the engine gearbox for ground test and troubleshooting of the IDG without running the aircraft gas turbine engine in its entirety; and an IDG air turbine clutch which can be controlled to connect the IDG with or disconnect the IDG from an air turbine, such that the IDG is normally disconnected from the air turbine and when the IDG is disconnected from the engine gearbox, the IDG can be connected with the air turbine for the air turbine to drive the IDG to provide back-up electric power in certain flight emergency and abnormal conditions and as a means to ground test and troubleshoot said IDG without running the aircraft gas turbine engine in its entirety; and when the IDG is connected with the engine gearbox, the IDG can be connected with the air turbine for the air turbine to drive the aircraft gas turbine engine through the IDG and the engine gearbox as back-up starter on ground and in flight.

2. An aircraft gas turbine engine of comprising a fan, a high pressure compressor, a combustor, a high pressure turbine connected to the high pressure compressor by a core shaft, a low pressure turbine connected to the fan by a fan shaft, and an engine gearbox fitted with:

an integrated drive generator (IDG) normally connected to the engine gearbox;

an engine driven pump (EDP) normally connected to the engine gearbox;

a fuel pump normally connected to the engine gearbox;

a hydro-mechanical unit (HMU) connected to the fuel pump; and an oil pump normally connected to the engine gearbox, wherein the EDP includes:

an EDP clutch which can be controlled to connect the EDP with or disconnect the EDP from the engine gearbox, such that the EDP is normally connected with the engine gearbox and the EDP can be disconnected from the engine gearbox for ground test and troubleshooting of the EDP and as a means to prevent damage to the EDP in certain flight emergency cases and abnormal conditions;

an EDP cranking pad which allows a motor to drive the EDP when the EDP is disconnected from the engine gearbox for ground test and troubleshooting of the EDP without running the aircraft gas turbine engine in its entirety; and an EDP air turbine clutch which can be controlled to connect the EDP with or disconnect the EDP from an air turbine, such that the EDP is normally disconnected from the air turbine and when the EDP is disconnected from the engine gearbox, the EDP can be connected with the air turbine for the air turbine to drive the EDP only to provide back-up hydraulic power in certain flight emergency cases and as a means to test and troubleshoot the EDP without running the aircraft gas turbine engine in its entirety; and when the EDP is connected to the engine gearbox, the EDP can be connected with the air turbine for the air turbine to drive the aircraft gas turbine engine through the EDP and the engine gearbox as back-up starter on ground and in flight.

3. An aircraft gas turbine engine, comprising a fan, a high pressure compressor a combustor a high pressure turbine connected to the high pressure compressor by a core shaft, a low pressure turbine connected to the fan by a fan shaft, and an engine gearbox fitted with:

an integrated drive generator (IDG) normally connected to the engine gearbox;

an engine driven pump (EDP) normally connected to the engine gearbox;

a fuel pump normally connected to the engine gearbox;

a hydro-mechanical unit (HMU) connected to the fuel pump; and an oil pump normally connected to the engine gearbox, wherein:

the fuel pump includes a fuel pump clutch which can be controlled to engage the fuel pump with or disengage the fuel pump from the engine gearbox, such that the fuel pump is normally engaged with the engine gearbox and the fuel pump can be disengaged from the engine gearbox for ground test and troubleshooting of the fuel pump and as a means to prevent damage to the fuel pump and the HMU in certain flight emergency cases and abnormal conditions; and the HMU includes an HMU cranking pad which allows a motor to drive the fuel pump through the HMU when the fuel pump is disengaged from the engine gearbox for ground test and troubleshooting of the fuel pump without running the aircraft gas turbine engine in its entirety.

4. An aircraft gas turbine engine, comprising a fan, a high pressure compressor a combustor a high pressure turbine connected to the high pressure compressor by a core shaft, a low pressure turbine connected to the fan by a fan shaft, and an engine gearbox fitted with:

an integrated drive generator (IDG) normally connected to the engine gearbox;

an engine driven pump (EDP) normally connected to the engine gearbox;

a fuel pump normally connected to the engine gearbox;

a hydro-mechanical unit (HMU) connected to the fuel pump; and an oil pump normally connected to the engine gearbox, wherein the oil pump includes:

an oil pump clutch which can be controlled to connect the oil pump with or disconnect the oil pump from the engine gearbox, such that the oil pump is normally connected with the engine gearbox and the oil pump can be disconnected from the engine gearbox in certain flight emergency cases and abnormal conditions to prevent damage to the oil pump, and for ground test and troubleshooting of the oil pump without running the aircraft gas turbine engine in its entirety; and an oil pump cranking pad which allows a motor to drive the oil pump when the oil pump is disconnected from the engine gearbox for ground test and troubleshooting of the oil pump without running the aircraft gas turbine engine in its entirety.

5. An aircraft gas turbine engine, comprising a fan, a high pressure compressor, a combustor, a high pressure turbine connected to the high pressure compressor by a core shaft, a low pressure turbine connected to the fan by a fan shaft, and an engine gearbox fitted with:

an integrated drive generator (IDG) normally connected to the engine gearbox;

an engine driven pump (EDP) normally connected to the engine gearbox;

a fuel pump normally connected to the engine gearbox;
a hydro-mechanical unit (HMU) connected to the fuel pump;
an oil pump normally connected to the engine gearbox;
a compressor including a compressor clutch that can be controlled to engage the compressor with or disengage the compressor from the engine gearbox; and
a turbine including a turbine clutch that can be controlled to engage the turbine with or disengage the turbine from the compressor, such that the compressor is normally engaged with the engine gearbox and the turbine is normally disengaged from the compressor, wherein when the turbine is engaged with the compressor, the turbine drives the engine through the compressor and the engine gearbox as back-up starter on ground and in flight; and when the compressor is disengaged from the engine gearbox, the compressor can be engaged with the turbine for the turbine to drive the compressor to provide back-up pneumatic power in certain emergency cases and abnormal flight conditions, and for ground use.

* * * * *